US 6,591,245 B1
United States Patent
Klug

(10) Patent No.: US 6,591,245 B1
(45) Date of Patent: *Jul. 8, 2003

(54) MEDIA CONTENT NOTIFICATION VIA COMMUNICATIONS NETWORK

(76) Inventor: John R. Klug, 5801 Bluebell La., Evergreen, CO (US) 80439

(*) Notice: Subject to any disclaimer, the term of this patent is extended or adjusted under 35 U.S.C. 154(b) by 0 days.

This patent is subject to a terminal disclaimer.

(21) Appl. No.: 09/407,000
(22) Filed: Sep. 28, 1999

Related U.S. Application Data

(63) Continuation-in-part of application No. 09/128,915, filed on Aug. 4, 1998, which is a continuation of application No. 08/595,837, filed on Feb. 2, 1996, now Pat. No. 5,790,785.
(60) Provisional application No. 60/102,115, filed on Sep. 28, 1998.

(51) Int. Cl.$^7$ .............................................. G06F 17/60
(52) U.S. Cl. ...................................................... 705/10
(58) Field of Search ........................................... 705/10

(56) References Cited

U.S. PATENT DOCUMENTS

| | | | |
|---|---|---|---|
| 4,766,293 A | 8/1988 | Boston | 235/379 |
| 5,001,628 A | 3/1991 | Johnson et al. | 364/200 |
| 5,235,642 A | 8/1993 | Wobber et al. | 380/25 |
| 5,241,594 A | 8/1993 | Kung | 380/4 |
| 5,263,158 A | 11/1993 | Janis | 395/600 |
| 5,455,953 A | 10/1995 | Russell | 395/739 |
| 5,469,576 A | 11/1995 | Dauerer et al. | 395/186 |
| 5,481,720 A | 1/1996 | Loucks et al. | 395/700 |
| 5,506,961 A | 4/1996 | Carlson et al. | 395/186 |
| 5,544,322 A | 8/1996 | Cheng et al. | 395/200.12 |
| 5,586,260 A | 12/1996 | Hu | 395/200.2 |
| 5,590,197 A | 12/1996 | Chen et al. | 380/24 |
| 5,604,490 A | 2/1997 | Blakely, III et al. | 340/825.31 |
| 5,611,048 A | 3/1997 | Jocobs et al. | 395/200.09 |
| 5,619,574 A | 4/1997 | Johnson et al. | 380/25 |
| 5,642,515 A | 6/1997 | Jones et al. | 395/727 |

(List continued on next page.)

FOREIGN PATENT DOCUMENTS

JP 07028724 * 7/1993 ............. G06F/9/06

OTHER PUBLICATIONS

Krantz, Michael. "Web Feat: Site Auditing." MediaWeek. vol. 5. Iss. 34. pp. 23. Sep. 11, 1995.*
"About I/CODE: A Universal Registration System," Internet Profiles Corporation, http://www.ipro.com.
Mahon, P. V., "Sesame V2 Public Key & Authorisation Extentions to Kerberos," IEEE, (1995), pp. 114–131.
Trostle, Jonathan. T., and Neuman, B. Clifford, "A Flexible Distributed Authorization Protocol," IEEE, (1996), pp. 43–52.
Aug. 1998, C&WC Lays out Interactive TV Plans, ComputerWire, Inc.*
Jun. 1998, NCR & Quadstone Help Banks Improve Service & Reduce Risk by Better Prediciting Customer Behavior, M2 Communications.*

Primary Examiner—Tariq R. Hafiz
Assistant Examiner—Rebecca M. Bachner
(74) Attorney, Agent, or Firm—Dorsey & Whitney LLP

(57) ABSTRACT

The notification system identifies media content based on personal preferences of individual users and provides notification of identified media content to the users. In one embodiment, the system (100) includes a number of user nodes (102, 104 and 106) that communicate with a registration site (110) and a notification site (112) via the internet (108). The notification site (112) includes a media content database (120) and a processor (118) running contents election logic. The processor (118) accesses the media content database (120) in order to identify content that may be of interest to particular users of the user nodes (102, 104 and 106). In this regard, content for a particular user may be identified by matching interest information obtained from the registration site (110) with the content information of the media content database (120).

10 Claims, 22 Drawing Sheets

U.S. PATENT DOCUMENTS

| | | |
|---|---|---|
| 5,671,354 A | 9/1997 | Ito et al. .................. 395/187.01 |
| 5,678,041 A | 10/1997 | Baker et al. ................. 395/609 |
| 5,682,428 A | 10/1997 | Johnson ........................ 380/23 |
| 5,682,478 A | 10/1997 | Watson et al. .......... 395/200.12 |
| 5,689,638 A | 11/1997 | Sadovsky .............. 395/188.01 |
| 5,692,049 A | 11/1997 | Johnson ........................ 380/25 |
| 5,694,595 A | 12/1997 | Jacobs et al. ................ 395/609 |
| 5,696,824 A | 12/1997 | Walsh .......................... 380/24 |
| 5,708,780 A | 1/1998 | Levergood et al. ..... 395/200.12 |
| 5,708,828 A | 1/1998 | Coleman ..................... 395/785 |
| 5,729,689 A | 3/1998 | Allard et al. ........... 395/200.58 |
| 5,757,920 A | 5/1998 | Misra et al. ................... 380/25 |
| 5,765,152 A | 6/1998 | Ericson .......................... 707/9 |
| 5,768,504 A | 6/1998 | Kells et al. ............. 395/187.01 |
| 5,774,551 A | 6/1998 | Wu et al. ...................... 380/25 |
| 5,790,785 A * | 8/1998 | Klug et al. |
| 5,809,144 A | 9/1998 | Sirbu et al. ................... 380/25 |
| 5,809,237 A | 9/1998 | Watts et al. ........... 395/200.32 |
| 5,812,784 A | 9/1998 | Watson et al. ......... 395/200.57 |
| 5,813,009 A | 9/1998 | Johnson et al. ............. 707/100 |
| 5,848,412 A | 12/1998 | Rowland et al. .............. 707/9 |
| 5,855,007 A | 12/1998 | Jovicic et al. ................. 705/14 |
| 5,866,889 A | 2/1999 | Weiss et al. ................. 235/379 |
| 5,884,312 A | 3/1999 | Dustan et al. ................ 707/10 |
| 5,890,140 A | 3/1999 | Clark et al. ................... 705/35 |
| 5,918,224 A | 6/1999 | Bredenberg ..................... 707/2 |
| 5,944,794 A | 8/1999 | Okamoto et al. ............. 709/22 |
| 5,983,351 A | 11/1999 | Glogau ........................ 713/201 |
| 6,029,195 A * | 2/2000 | Herz ........................... 707/10 |
| 6,058,378 A | 5/2000 | Clark et al. ................... 705/37 |
| 6,058,393 A | 5/2000 | Meier et al. ................... 707/10 |
| 6,073,105 A | 6/2000 | Sutcliffe et al. ................ 705/1 |
| 6,131,810 A | 10/2000 | Weiss et al. ................. 235/379 |
| 6,173,287 B1 * | 1/2001 | Eberman et al. ............ 707/102 |

* cited by examiner

MEDIA CONTENT NOTIFICATION VIA COMMUNICATIONS NETWORK

RELATED APPLICATION INFORMATION

This application claims priority from U.S. Provisional Patent Application Serial No. 60/102,115, filed on Sep. 28, 1998. This application is a Continuation-in-Part of U.S. patent application Ser. No. 09/128,915, filed on Aug. 4, 1998, which is a Continuation of U.S. patent application Ser. No. 08/595,837, filed on Feb. 2, 1996, which application issued as U.S. Pat. No. 5,790,785.

FIELD OF THE INVENTION

The present invention relates in general to media content notification and, in particular, to a method and apparatus for identifying content of potential interest to a given network user based on user information specific to the user and using a communication network to provide notification to the user regarding the identified media content.

BACKGROUND OF THE INVENTION

In recent years, the types and quantity of media content available to consumers has expanded dramatically. Not too long ago, the media content available to many consumers at a given time might have included live performances or athletic events at perhaps a few venues, audio programming delivered via several radio stations and television programming delivered via a few channels. Today, live performances and athletic events have been increased in many areas and many choices are available via radio and television. In the latter regard, it is no longer uncommon to have access to hundreds of television channels. In addition, the internet increasingly competes for the attention of consumers with seemingly unlimited content options.

Without question, this explosion in media content has been driven, to some extent, by consumer demand and consumers have benefitted greatly from the increased entertainment and other information opportunities. However, the shear quantity of choices has also created some frustration. In particular, many consumers now find it difficult and unacceptably time consuming to keep track of the available choices and conventional guides are sometimes of little assistance. For example, conventional TV guides have been expanded in many cases to cover the many choices available via cable or a satellite dish. However, such guides can be difficult to use, especially when they attempt to cover cable choices that vary from area to area or when they attempt to cover all programming for hundreds of channels.

As a result, some consumers have been reduced to so-called "channel surfing" in an attempt to manually survey the available options or have effectively given up on the idea of identifying the most interesting available option by adopting the habit of regularly returning to only a small number of channels. Even if one could become proficient in using conventional television guides and devoted the time necessary to select from all available options, only one medium would be mastered and the challenge of keeping track of other media would remain.

SUMMARY OF THE INVENTION

The present invention is directed to a method and apparatus for identifying media content based on personal preferences and providing notification thereof, for example, via a communications network such as a telephone network or the Internet. The invention helps network users to keep track of the many media content options available and, therefore, to enjoy and more fully utilize the available media.

In accordance with one aspect of the present invention, content notifications are provided based on the interests of a particular network user. The corresponding method includes the steps of obtaining interest information relating to the interests of a particular consumer, identifying media content based on the interest information, generating notification information pertaining to the identified media content, and using a communications network to transmit the notification information to the network user. In this manner, the notifications can be tailored to the user's interests so as to reduce the incidence of notifications that are not of interest and also so as to reduce the incidence of missed notifications that would have been of interest to the network user.

Preferably, the interest information is obtained by voluntary participation of the user. For example, the user may provide information relative to the demographics, psychographics, product interests, programming interests and lifestyle of the user upon registering to participate in the content notification program. Such information may have already been made available by the user at a separate registration site. Alternatively, information regarding the user may be obtained based on a monitored history of television network usage, Internet usage, or other information that may be derived by monitoring the user. Additionally, stored interest information may be continuously or periodically updated based on a learning process implemented by intelligent code based on television network or Internet usage patterns or the like. Such interest information can be employed to tailor the media content notifications to the user's likely interests, thereby enhancing the value of the notification program.

The interest information may include any of various types of information that are preferably provided or determined at least in part by the user. Examples include: user contact information such as a name, billing or residence address, URL, or phone number; financial information such as a credit card number or bank account number; service or product information useful in shopping for or purchasing airline tickets, hotel rooms, books, music, clothing, etc.; personal interest information for identifying programming of likely interest to the user; personal records such as medical records and investment information (e.g., purchases, when purchased, prices, ticker symbols, numbers of shares, etc.); and other demographic or personal information. The notification information may be transmitted to the user via e-mail, wireless or wire-line telephone network, Web TV, or other communications network.

According to another aspect of the present invention, a user may register to receive media content notifications from time to time. For example, the user may elect to receive program notifications on a regular or periodic basis or upon the occurrence of certain trigger events. In this manner, the user may receive media content notifications on a daily, weekly or other basis. Additionally, the user may register to be notified upon the occurrence of certain events such as the announcement of a concert or other performance date, the release of a sound recording or other product, or other types of announcements. In this manner, the user can exercise control over the amount or frequency of notifications.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION OF THE INVENTION

In the following description, the invention is set forth in the context of an Internet-based system for providing media content notifications via e-mail. However, it will be appreciated that program notifications may be provided in accordance with the present invention via other types of communications networks such as Web TV, data networks other than the Internet, wireless or wire-line telephone networks and other public or private networks.

Figure 1:
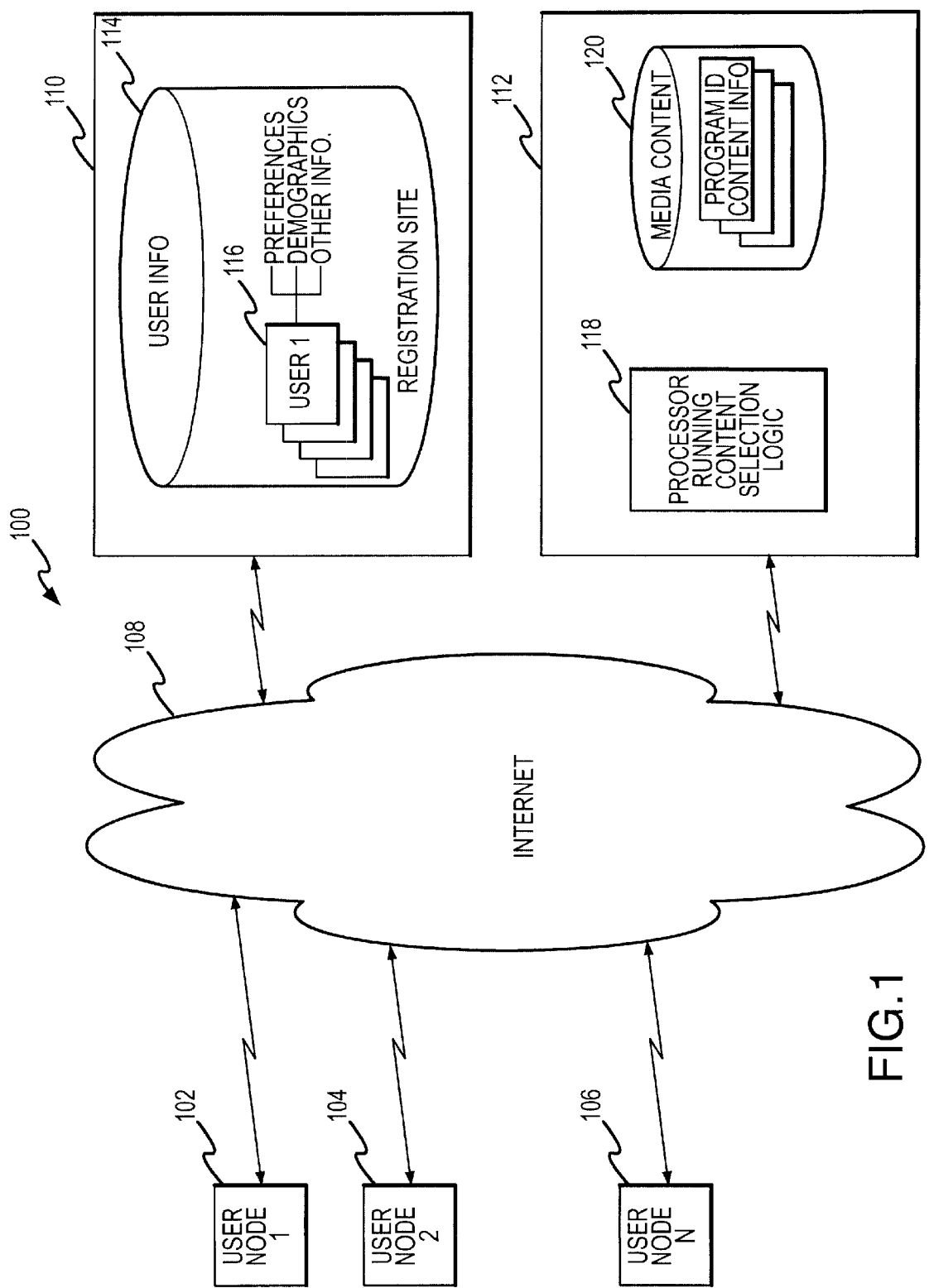
FIG. 1 is a schematic diagram illustrating a communications network in which the present invention may be implemented.

Referring to FIG. 1, a content notification system in accordance with the present invention is generally identified by the reference numeral 100. The system 100 includes a number of user nodes 102, 104 and 106 that communicate with a registration site 110 and a notification site 112 via the Internet 108. Although the registration site 110 and notification site 112 are illustrated as being independent World Wide Web sites in FIG. 1, it will be appreciated that the functionality of the sites 110 and 112 may be combined or may be fully or partially implemented by logic resident at the user nodes 102, 104 and 106. In addition, although only three user nodes are illustrated, it will be understood that substantially any number of user nodes may be serviced in accordance with the present invention.

In the illustrated embodiment, the user nodes 102, 104 and 106 are illustrated as being data terminals that are accessible via the Internet 108. Such user nodes 102, 104 and 106 may be embodied as desktop or laptop computers, wireless or wire-line telephones incorporating data network terminals, televisions incorporating data network terminals or any other internet compatible devices. The user nodes 102, 104 and 106 are capable of receiving media content notifications via e-mail. Although not shown, such content notifications could alternatively be transmitted to a user via a telephone, a pager or other communications network device or via fax or regular mail.

The registration site 110 includes a user information database 114 storing files 116 containing information for various network users. Such information may be useful in identifying media content of potential interest to the various network users, and may include program preferences entered by the users, demographic information entered by the user or derived from other sources, and other information. Such a registration site is described in detail in U.S. Pat. No. 5,790,785 and co-pending U.S. patent application Ser. No. 09/128,915, both of which are incorporated herein by reference.

The notification site 112 includes a media content database 120 and a processor 118 running content selection logic. The media content database includes files of information regarding media content. For example, in the case of a television program, each file may include a program title or other identifier, scheduling information, and content information. The program identification information may include, for example, in the case of a television program, the title of the program, the series title, and/or an episode identifier. The scheduling information may include the time or times at which the program is to be aired and the duration of the program. The content information may include information regarding the content of the program provided by the content provider or otherwise. For example, the content provider may provide information identifying the subject matter of the program, the target demographics of the program, representative advertisers of the program or other information that may be useful in identifying network users likely to be interested in the program. Alternatively, such content information may be derived based on the title of the program, current or past advertisers of the program or other information. Similar types of content information may be provided for other types of media.

The processor 118 accesses the media content database 120 in order to identify content that may be of interest to particular users of the user nodes 102, 104 and 106. In this regard, content for a particular user may be identified by matching interest information obtained from the registration site 110 with the content information of the media content database 120.

Figure 2:
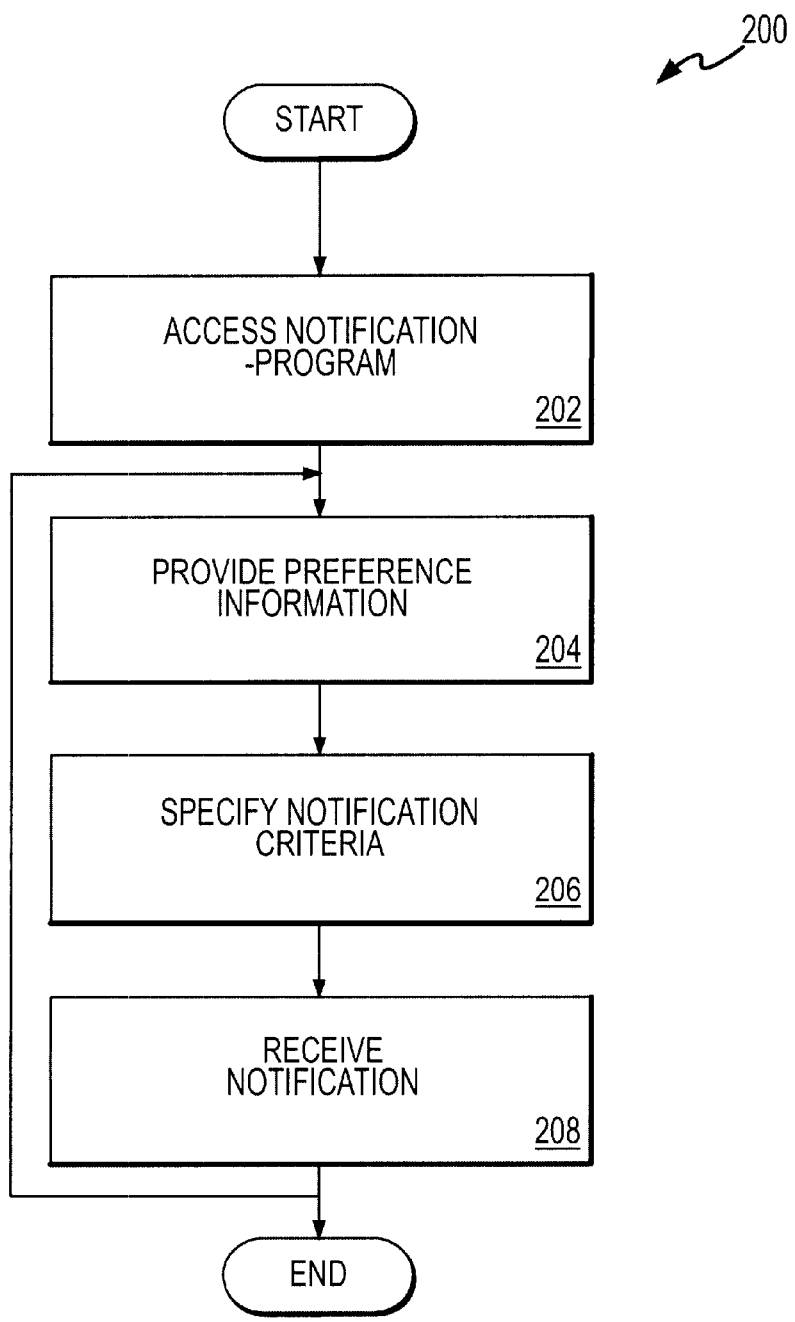
FIG. 2 is a flow chart illustrating a process for utilizing the notification program of the present invention.

FIG. 2 is a flow chart of a process 200 that may be implemented by a user of the notification program. The illustrated process 200 is initiated by accessing (202) the notification program. In this regard, the notification program may be executed at a notification site as illustrated in FIG. 1. Thus a notification program may be accessed by establishing a link with the URL associated with the notification site. Alternatively, the notification program may be executed in part or in whole at the user node. For example, the notification program may be downloaded from the notification site or may otherwise be loaded onto the user node via a disk or other medium.

Once the notification program is accessed, the user may provide (204) preference information for use by the notification program. Preferably, as illustrated, the preference information is voluntarily provided by the user. The preference information may be provided by filling out a questionnaire presented by the notification program. For example, the questionnaire may prompt the user to enter information identifying programs, authors, artists, or other content information of interest to the user. In addition, the user may be prompted to enter information regarding hobbies, periodical subscriptions and other subjects of interest to the user. The user may also be prompted to enter demographic information that may be useful in identifying media content of interest. Alternatively, the user may provide preference information by referring the notification program to information stored at the registration site. It will be appreciated that such information stored at the registration site may be available for a variety of purposes other than use by the notification program.

The user may also be prompted to specify (206) notification criteria. Such notification criteria may including notification scheduling information. For example, a user may indicate that he wishes to receive content notifications on a daily, weekly or other basis. Or, the user may specify an interest in receiving notifications based on certain triggering events such as concert or other event announcements, releases of sound recordings, publications or the like, or other scheduled or unscheduled events.

Once such information is provided to the notification program, the user will receive (208) notifications of media content of potential interest to the user. Such notifications may be received via e-mail, phone calls, via regular mail or by any other suitable mechanism. In addition to the content notification information, the user may be guided to related content, such as web sites or other media portals related to an event or artist(s) related chat sessions, etc. Such notifications may be provided in connection with personalized versions of portals such as "MyYahoo," "MyLycos" or the like.

Figure 3:
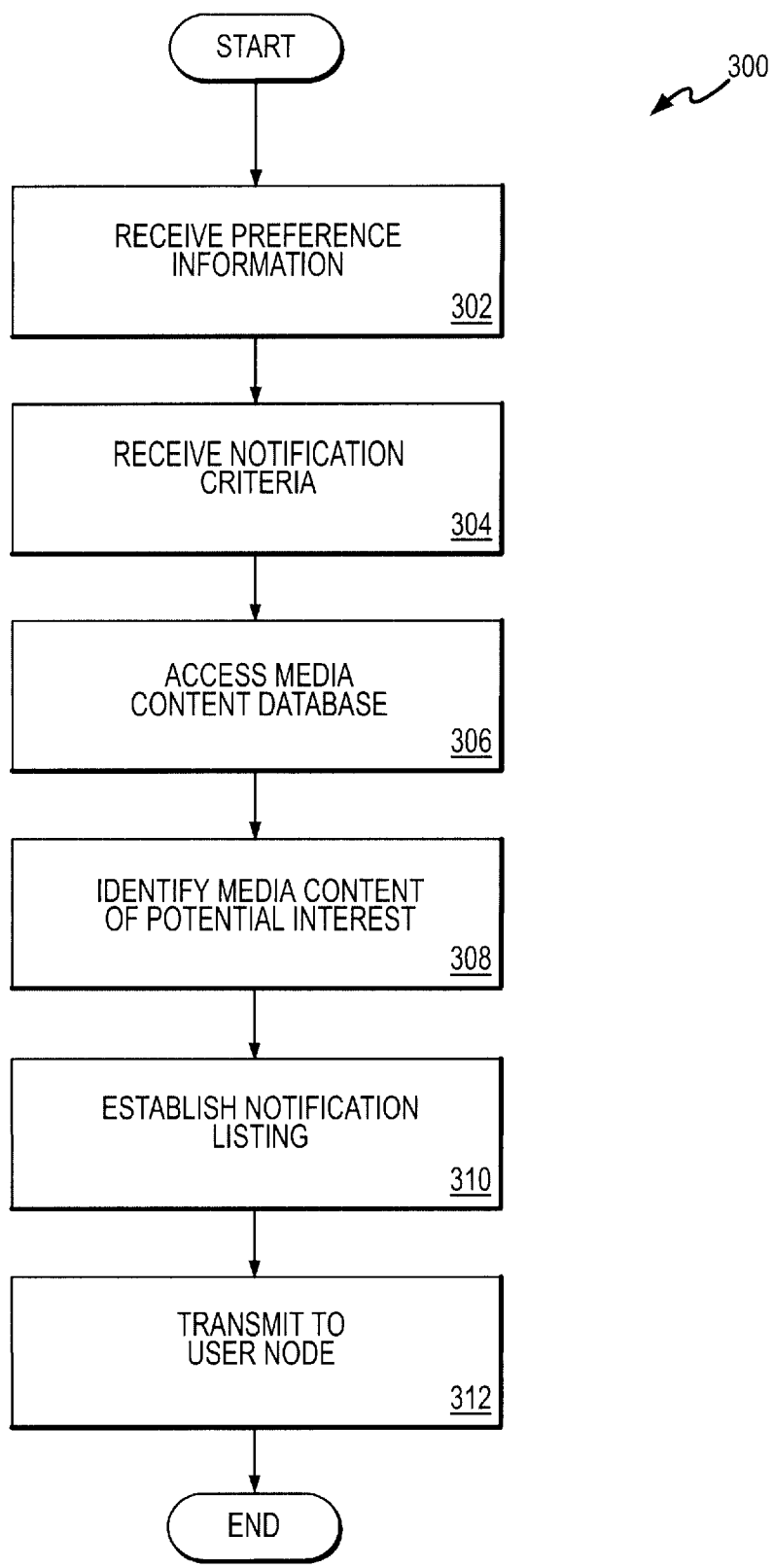
FIG. 3 is a flow chart illustrating a process implemented by the notification program of the present invention.

Referring to FIG. 3, a process 300 implemented by the notification program is illustrated. The illustrated process 300 is initiated by receiving (302) preference information and receiving (304) notification criteria information as discussed above. Based on this received information, the program accesses(306) the media content database so as to identify (308) media content of potential interest to each subscribing user. The media content may be identified by iteratively comparing the content files to the preference information, by utilizing the links of a relational database or through other appropriate means.

Based on the identified content, the program then establishes (310) a notification listing. This listing may be presented in the form of an e-mail, an audio recording, a hard copy listing or other medium as appropriate. The listing is then transmitted (312) to the user. Such transmission may be electronic, by facsimile, via hard copy or in any other suitable form.

Many revenue models may be established in connection with the media notification program. Users may pay a subscription fee for using the program. Content providers may also pay fees in order to be included in the program. In addition, revenues may be generated by placement of advertisements at the notification site or pushing advertisements to users in connection with notifications or otherwise. Such advertisements may also be selected based on information specific to the user. For example, a user who has asked to be notified of golfing programs on television may receive advertisements for golf equipment, golf vacations and the like. The notification program may provide the user an option to receive or not receive such advertisements.

Figure 4:
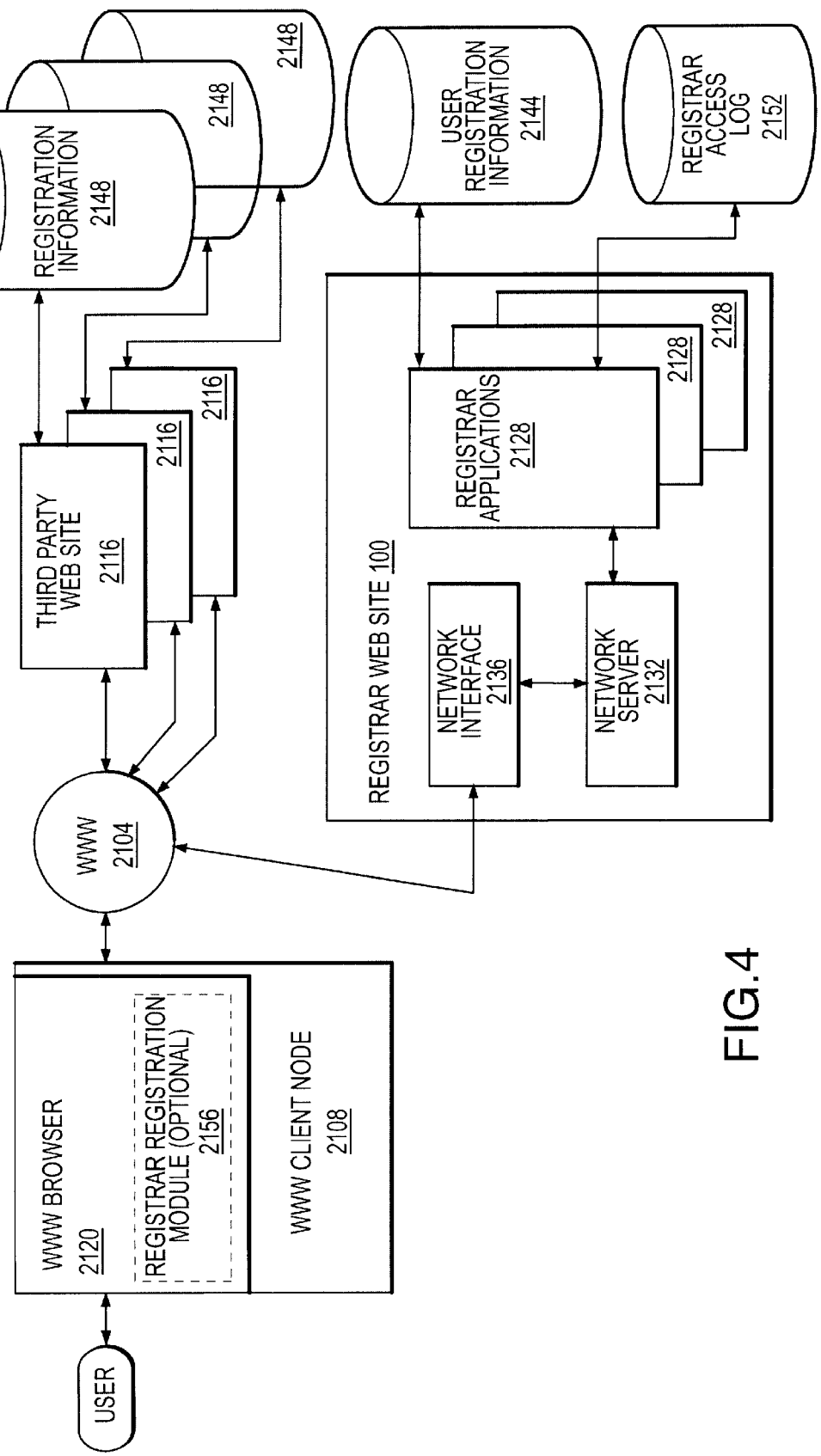
FIG. 4 is a block diagram of the web site registration information processing system of the present invention, wherein this system is shown in the context of its connections to various nodes of the World Wide Web.

As described above, the system 100 may include a registration site as described in detail in U.S. Pat. No. 5,790, 785. FIG. 4 is a block diagram of such a web site registration information processing system of the present invention, (hereinafter also denoted by the name "registrar") wherein this system is shown in the context of its connections to various nodes of the World Wide Web (WWW). In a first embodiment, a web site, denoted the registrar web site 2100, provided by the present invention, is connected to the World Wide Web 2104 for communicating with both World Wide Web client nodes such as WWW client node 2108, and with other web sites such as third party web site 2116, wherein the registrar web site 2100 facilitates the registration of a user at a WWW client node 2108 when this user desires to register at the third party web site 2116. In this first embodiment, the user accesses the World Wide Web 2104 through a WWW browser 2120 on a WWW client node 2108 wherein, to use the registration facilities of the registrar web site 2100 for registering the user at a one or more third party web sites 2116, the user must in some manner request explicit access to the registrar web site 2100 for registering his/her registration information to the registrar web site 2100. Additionally, in this first embodiment of the present invention, the WWW client node 2108 need not have executable program modules designed specifically for interfacing with the registrar web site 2100. That is, substantially any conventional World Wide Web browser may be used as the WWW browser 2120.

Thus, the first embodiment of the present invention may be described as follows. In order for a user to register at one or more third party web sites 2116, the user at a WWW client node 2108 accesses the World Wide Web 2104 and in a first scenario explicitly navigates through the World Wide Web 2104 to the registrar web site 2100 wherein a registrar web site 2100 home page is communicated back to the user's WWW browser 2120. As one skilled in the art will appreciate, program modules 2128 (hereinafter denoted "registrar applications") output, to a World Wide Web network server 2132, information in, for example, a hypertext markup language (HTML) related to capabilities of the registrar web site 2100 in assisting the user in registering at third party web sites 2116. Such outputs from registrar applications 2128, are subsequently transmitted, via the network server 2132 and the network interface 2136, to the user's WWW browser 2120 in the hypertext transfer protocol (HTTP), as one skilled in the art will appreciate. Thus, upon presentation of the registrar web site 2100 home page on the user's WWW client node 2 108, the user subsequently may request to provide registration information to the registrar web site 2100 so that he/she can have this information at the registrar web site 2100 automatically transferred to a third party web site 2116 when the user is requested to register at such a third party web site. Subsequently, after the user's request to supply registration information is transmitted to the registrar web site 2100 (via World Wide Web 2104, network interface 2136 and network server 2132), the registrar applications 2128 receive the request and output to the user's WWW browser 2120 one or more "web pages" having fill-out forms to be presented to the user via the WWW browser 2120. Thus, upon submittal of the filled out forms by the user to the registrar web site 2100 (more precisely, the registrar applications 2128), the user's registration information is stored in the user registration information database 2144.

Following the above registration procedure at the registrar web site 2100, the user may then substantially automatically register at various third party web sites 2116 that are affiliated with the registrar web site 2100 in that an agreement has been reached between each such third party web site 2116 and the registrar web site 2120 for transmitting a user's registration information to the third party web site 2116 when, for example, the user requests such transmittal. Thus, assuming the user accesses the third party web site 2116 and, for example, the home page for the third party web site 2116 includes a form field allowing the user to specify that the user's registration information is stored and accessible at the registrar web site 2100, then the user can submit a response, via the World Wide Web 2104, to the third party web site 2116 indicating that the user's registration information should be obtained from the registrar web site 2100. Thus, the third party web site 2116 requests and receives the user's registration information from the registrar web site 2100 and stores the user's registration information in registration information database 2148 directly accessible by the third party web site 2116. Additionally note that when the registrar web site 2100 receives a request from the third party web site 2116 for user registration information, a registrar application 2128 records the request for the user's registration information in a registrar access log data base 2152. Thus, the registrar web site 2100 maintains a log of the third party web sites requesting registration information. Further, such third party web sites 2116 may periodically provide the registrar web site 2100 with information related to the frequency that users registered at the registrar web site 2100 have accessed the third party web sites 2116. Therefore, by also storing this information, for example, in the registrar access log 2152, the registrar web site 2100 is able to determine the frequency and type of access of third party web sites 2116 by users.

In a second method of using the first embodiment of the present invention, instead of the user explicitly navigating the World Wide Web 2104 to the registrar web site 2100 for providing registration information, the user may instead access a third party web site 2116 wherein the home page or registration page for the third party web site includes input fields allowing the user to request that the registrar web site 2100 automatically be accessed so that the user can enter web site registration information at the registrar web site 2100 and subsequently use the registration information provided to the registrar web site 2100 for automatically registering at the third party web site 2116 (as well as other third party web sites that may be subsequently requested). That is, the newly entered registration information is transferred to the third party web site 2116 by entering into a registrar specific portion of the registration form for the third party web site 2116 a registrar user identification and optionally a password for requesting that the third party web site access the registrar web site 2100 to obtain the user's registration information. Thus, the user's registration information automatically is communicated to the third party web site 2116 without the user explicitly having to navigate the World Wide Web 2104 and access the registrar web site 2100 to register his/her web site registration information.

Note that alternative embodiments are within the scope of the present invention, wherein program modules for the present invention are distributed so that there is an executable module provided on the user's WWW client node 2108 for communication with the registrar web site 2100 as well as with third party web sites 2116 that accept registration information from the present invention. In one embodiment of such a distributed architecture for the present invention, a registrar registration module 2156 is integrated into the user's WWW browser 2120 for gathering the user's web site registration information and communicating with the registrar web site 2100 as well as cooperating third party web sites 2116 at which the user desires to register. Such a registration module 2156 may provide the user with easier access to his/her registration information since the information resides locally on the user's WWW client node 2108 in a persistent nonvolatile storage. Further, the registrar registration module 2156 may be activated for entering or updating user registration information without the user necessarily being connected to the World Wide Web 2104. Moreover, by integrating the registrar registration module 2156 into the user's WWW browser 2120, the user is presented with an integrated set of functions for registering and accessing third party web sites 2116.

Thus, in such distributed architectures, after the user has entered registration information into the registrar registration module 2156, this module will substantially automatically contact the registrar web site 2100 (via the World Wide Web 2104) and thereby communicate the user's registration information to the registrar web site 2100 so that, for example, the user's registration information may be reliably stored in case there are failures at the user's WWW client node 2108. Thus, to access a third party web site 2116 that cooperates with the registrar for registering the user, once the user has made contact through the World Wide Web 2104 with such a third party web site 2116, the user transfers his/her registration information from the registration module 2156 to the third party web site. Further note that in the registration process of the present embodiment, whenever the user registers at a third party web site 2116, the registrar web site 2100 is provided, by (for example) the module 2156, with information related to the registration so that the user also has a off-site backup copy of all registrations at third party web sites residing at the registrar web site 2100.

Note that other distributed architectures for the present invention are also contemplated wherein the registrar registration module 2156 on the user's WWW client node 2108 is not integrated with the user's WWW browser 2120. In such an embodiment, the user may be faced with a different user interaction technique for the module 2156 than that of the WWW browser 2120.

However, the user is provided with added flexibility in choosing a WWW browser 2120 and/or using his/her existing browser 2120 which may not contain as part of the browser the registrar registration module 2156.

Figure 5A:
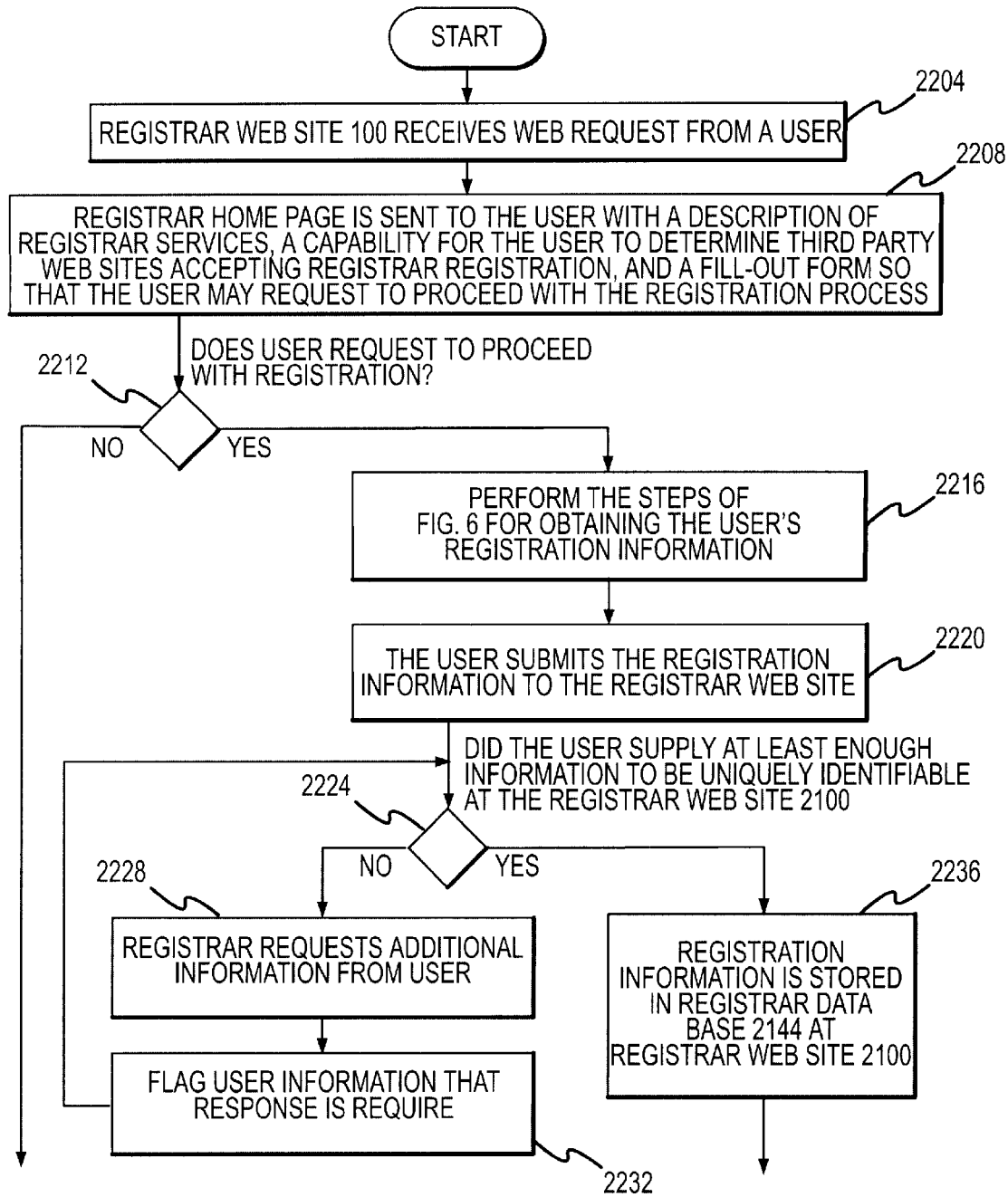
FIGS. 5A and 5B provide a flowchart for describing the steps performed when a user of the World Wide Web explicitly contacts the registrar web site 2100 of the present invention for supplying registration information to be used in registering at third party web sites 2116.
Figure 5B:
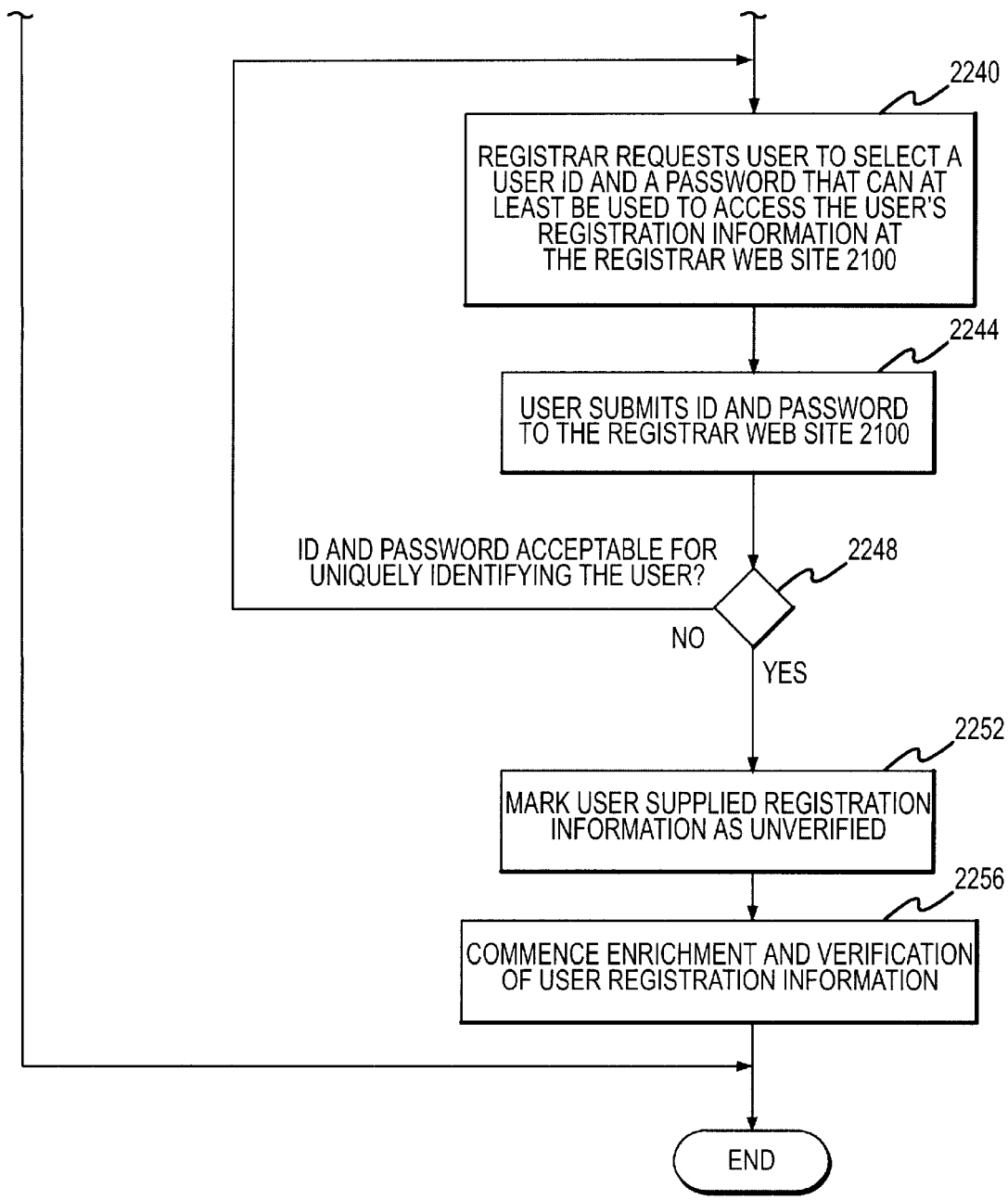
Figure 6:
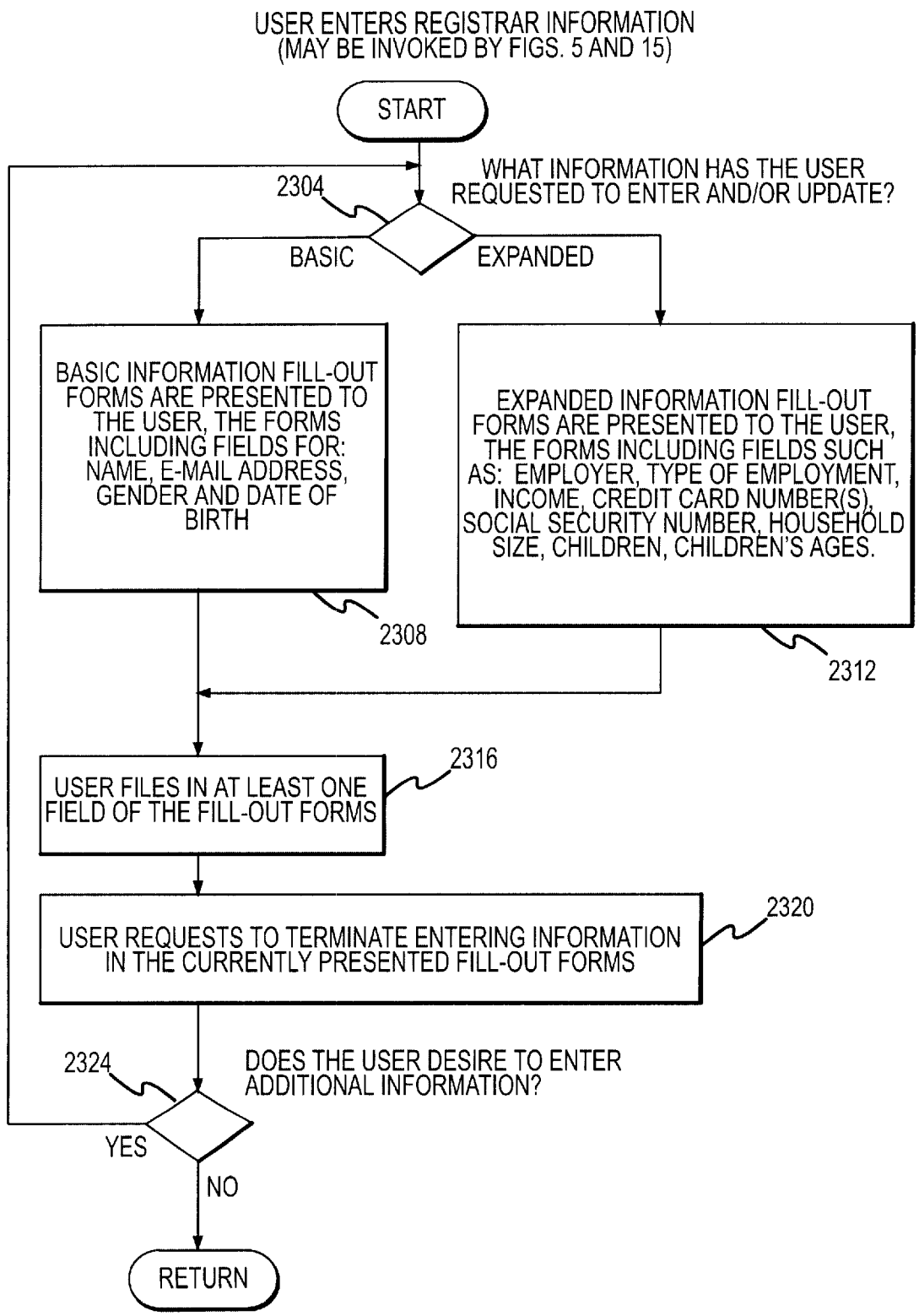
FIG. 6 is a flowchart presenting the steps a user of the World Wide Web performs when entering web site registration information into fill-out forms that are to be submitted to the registrar web site 2100 of the present invention.

In FIGS. 5A and 5B, a flowchart is presented describing the steps performed when the user explicitly navigates the World Wide Web 2104 to contact the registrar web site 2100 for supplying registration information. Accordingly, assuming the user contacts the registrar web site 2100, in step 2204 the web site 2100 receives the user's request for information. Subsequently, in step 2208 the registrar web site 2100 responds with a home page describing the registrar services, a selection or browsing capability for reviewing third party web sites 2116 accepting registrar registrations, and a fill-out form so that the user may request to proceed, if desired, with entering registration information at the registrar web site 2100. In step 2212 the user determines whether to proceed with the registration process or not. Assuming the user elects to proceed, the request to proceed is transferred back to the registrar web site 2100 wherein a registrar application 2128 examines the response and outputs a fill-out form that is transmitted back to the user's WWW browser 2120 so that the user may enter his/her registration information and submit it to the registrar web site 2100. Thus, in step 2216 the steps of the flowchart of FIG. 6 are performed by the user when entering information into the registration fill-out form provided by the registrar web site 2100. Subsequently, in step 2220 the user initiates the transfer of his/her registration information to the registrar web site 2100. Note that the submittal of the registration information may be performed by a conventional electronic transfer through the World Wide Web 2104 using any one of various internet protocols or, alternatively, other techniques for transferring the information to the registrar web site 2100 are also contemplated.

For example, the user may fax a printed copy of a completed registration form to the registrar web site 2100 at which point the information may be manually input into the user registration information database 2144. In step 2224, upon receiving the user's registration information, one or more registrar applications 2128 review the user's registration information for determining whether there is enough information supplied to at least uniquely identify the user. If not, then in steps 2228 and 2232 a registrar application(s) 2128 requests additional information from the user and flags the user's information currently stored in the user registration information database 2144 indicating that a user response is required to further process the user's information. As an aside, note that other feedback loops to the user are contemplated that are related to the loop of steps 2224 through 2232. For example, it may be the case that the user has supplied sufficient information to be uniquely identifiable at the registrar web site 2100, but the user has supplied insufficient information for the registrar web site 2100 to supply adequate information to most third party web sites 2116 that utilize registrar registration capabilities. Thus, a similar feedback loop to loop 2224 through 2232 may be provided for requesting that the user supply additional information so that a substantial number of third party web sites 2116 cooperative with registrar will allow the user to register at them using only the information supplied by the registrar web site 2100.

Referring again to step 2224, if a determination is made that sufficient registration information has been received at the registrar web site 2100, the user's registration information is stored in the user registration information database 2144 (step 2236) and subsequently a registrar application 2128 outputs a request to the user to select a user ID and password that can be at least used to access the user's registration information at the registrar web site 2100 (step 2240).

Assuming, as in step 2244, that the user submits a user ID and a password to the registrar web site 2100, then in step 2248 a determination is made by the present invention (more particularly, a registrar application 2128) as to whether the user supplied ID and password is acceptable for uniquely identifying the user. If not, then steps 2240 through 2248 are repeated until an appropriate user ID and password are entered by the user. Thus, assuming that an acceptable user ID and password are provided, in step 2252 the registration information supplied by the user is marked as unverified since there has been no independent confirmation that the user supplied information is accurate. Subsequently, in step 2256 a registrar application 2128 commences to enrich the user's supplied registration information with publicly available information related to the user and, to the degree possible (i.e., conforming with internet etiquette, privacy concerns of users, and public policy), to verify the user's registration information. Note that by comparing the user supplied information with information about the user from other sources, a determination can be made as to the accuracy of the user supplied information. Thus, whenever an item of the user supplied information is independently verified, then that item is unmarked. Alternatively, if discrepancies arise between the user-supplied information and other publicly available information about the user, then the user may be alerted to these discrepancies and requested to confirm his/her initial responses.

Referring now briefly to FIG. 6, this flowchart presents the steps a user performs when entering web site registration information into the fill-out forms to be submitted to registrar. Accordingly, in step 2304 the user determines whether to supply basic information (i.e., requested by a substantial number of third party web sites 2116) as described in step 2308 or to supply expanded information (i.e., more extensive information about the user so that, for example, registrar has sufficient user information to register the user at substantially all cooperating third party web sites 2116). Note that at least in one embodiment, the basic information supplied in step 2308 (i.e., the user's name, e-mail address, gender and date of birth) is also requested in the forms for expanded information in step 2312. Thus, upon filling in at least one field from the fill-out forms (step 2316) presented in either step 2308 or 2312 the present invention field checks the user's input for syntactically appropriate responses. Subsequently, in step 2320, the user inputs a request to terminate entering information in the presently presented fill-out form(s) and in step 2324 the user determines whether to enter additional information in either the basic registration information fill-out forms or the expanded information fill-out forms. If the user indicates that he/she desires to enter further registration information, then step 2304 is again performed. Alternatively, the flowchart returns to the invoking program (flowchart) with the user supplied registration information.

Figure 7A:
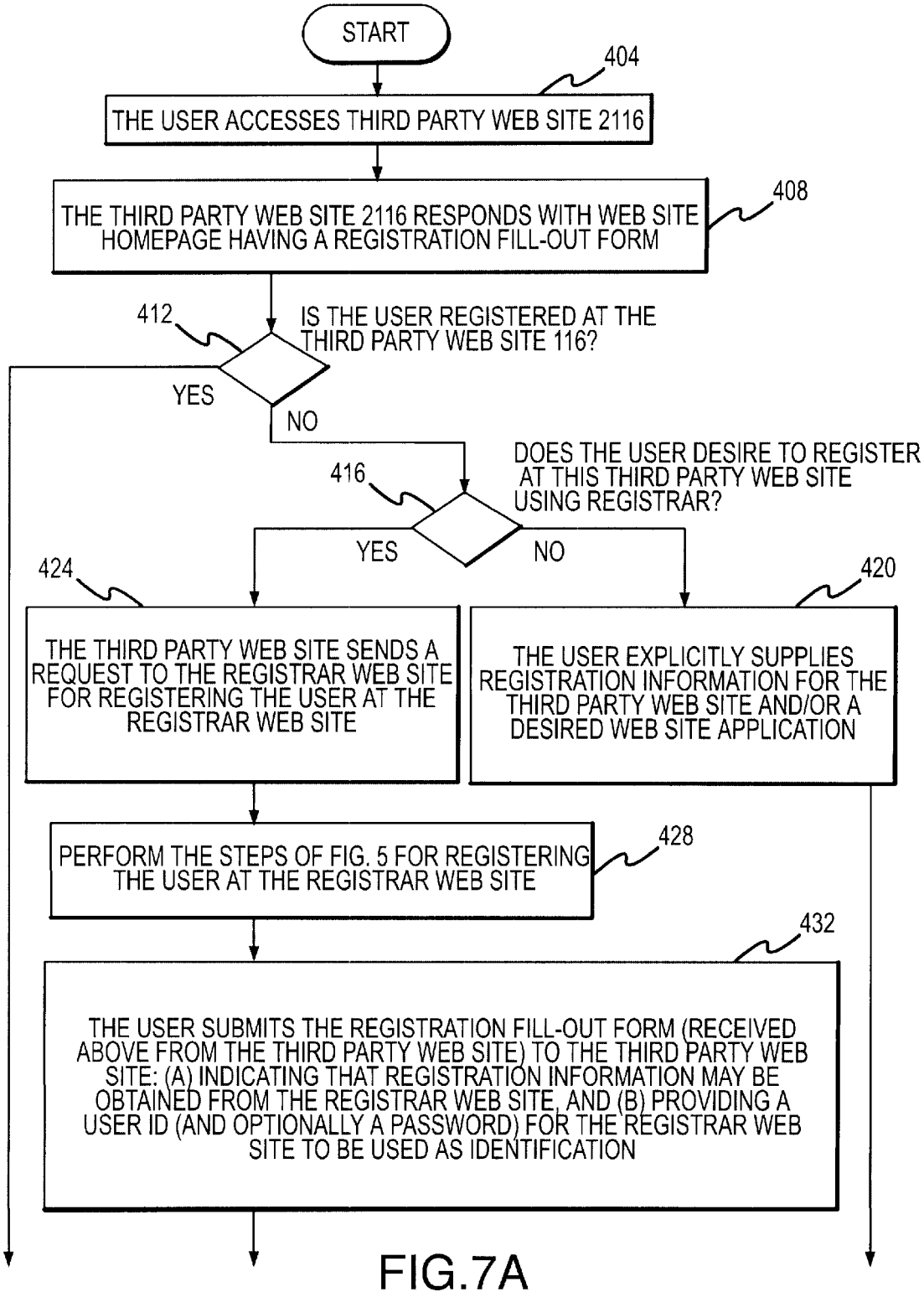
FIGS. 7A and 7B present a flowchart for the steps performed when a user of the World Wide Web accesses a third party web site 2116, cooperating with the present invention, and in the process of registering at the third party web site the user is automatically put in contact with the registrar web site 2100 of the present invention so that registration information may be provided to the present invention for registering the user at the present third party web site as well as other third party web sites that the user may subsequently request.
Figure 7B:
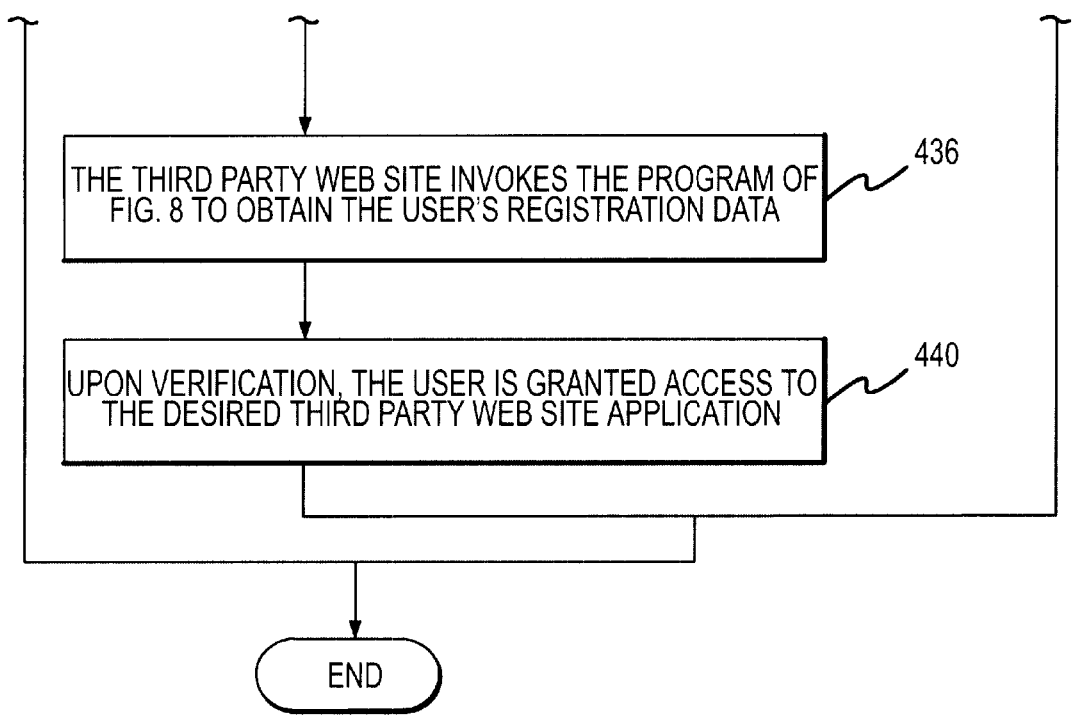

FIGS. 7A and 7B present a flowchart for the steps performed when the user accesses a present third party web site 2116 cooperating with registrar, and in the process of registering at the third party web site the user is automatically put in contact with the registrar web site 2100 so that registration information may be provided to registrar for registering the user at the present third party web site as well as other third party web sites that the user may request. Accordingly, assuming the user uses a WWW browser 2120 to access a third party web site 2116 as in step 404, the third party web site responds with a web site home page (step 408) typically having a registration fill-out form into which the user is requested to enter registration information. Note that the user may or may not be registered at this third party web site. Thus, if the user is registered, then he/she may only need to enter a user ID and optionally a password in order to gain access to a desired application at the third party web site. Further note that for different third party web sites 2116, the user's identification (and optionally a password) may be different due to constraints on user ID (and password) syntax being different at different third party web sites. Further, such user IDs at different web sites may be different because a user ID requested by the user may already have been assigned to another user.

Subsequently, once the third party web site 2116 has received a response from the user, a determination is made as to whether the user is registered at the web site (step 412). If the user is registered, then no further processing related to the present invention is required. Alternatively, if the user is not registered at the third party web site, then a response is transferred from the third party web site 2116 through the World Wide Web 2104 to the user's WWW browser 2120 providing the user with the fill-out forms in which the user is requested to enter information for registering at the third party web site. Note that if the third party web site 2116 is configured to accept user registration information from the present invention, then at least one fill-out form related to registering at the third party web site 2116 will request information related to registering the user by using the present invention. In particular, the third party web site 2116 may present the user with a fill-out form requesting the user to enter a user ID and optionally a password for the present invention (i.e., registrar) if the user is registered at the registrar web site 2100. Additionally, the presented fill-out forms may request the user to indicate whether he/she prefers to register at the third party web site 2116 by using registrar. Thus, assuming the user desires to register at the third party web site 2116, a determination is made as to whether the user wishes to register using the present invention or register at the third party web site without using the present invention (step 416). If the user chooses to not use the present invention for registering at the third party web site 2116, then the user explicitly supplies registration information for the present third party web site (step 420). Alternatively, if the user chooses to use registrar to register, then once the present third party web site 2116 receives a response from the user indicating the choice to use registrar to register, in step 424, the present third party web site sends a request to the registrar web site 2100 for registering the user at the registrar web site 2100. Subsequently, in step 428 the steps of FIGS. 5A and 5B are performed for registering the user at the registrar web site 2100. Subsequently, after registering at the registrar web site 2100, in step 432, the user is automatically placed in contact with the present third party web site so that he/she submits a registration fill-out form to this third party web site 2116: (a) indicating that the user's registration information may be obtained from the registrar web site 2100; and (b) providing a user ID (and optionally a password) for the registrar web site 2100 to be used as identification at the present third party web site. Following this, in step 436 the third party web site 2116 invokes the program corresponding to FIG. 8 to obtain the user's registration data from the registrar web site 2100.

Lastly, upon verification by the third party web site 2116 of the user's registration data, the user is granted access to the desired third party web site and/or application (step 440).

Figure 8:
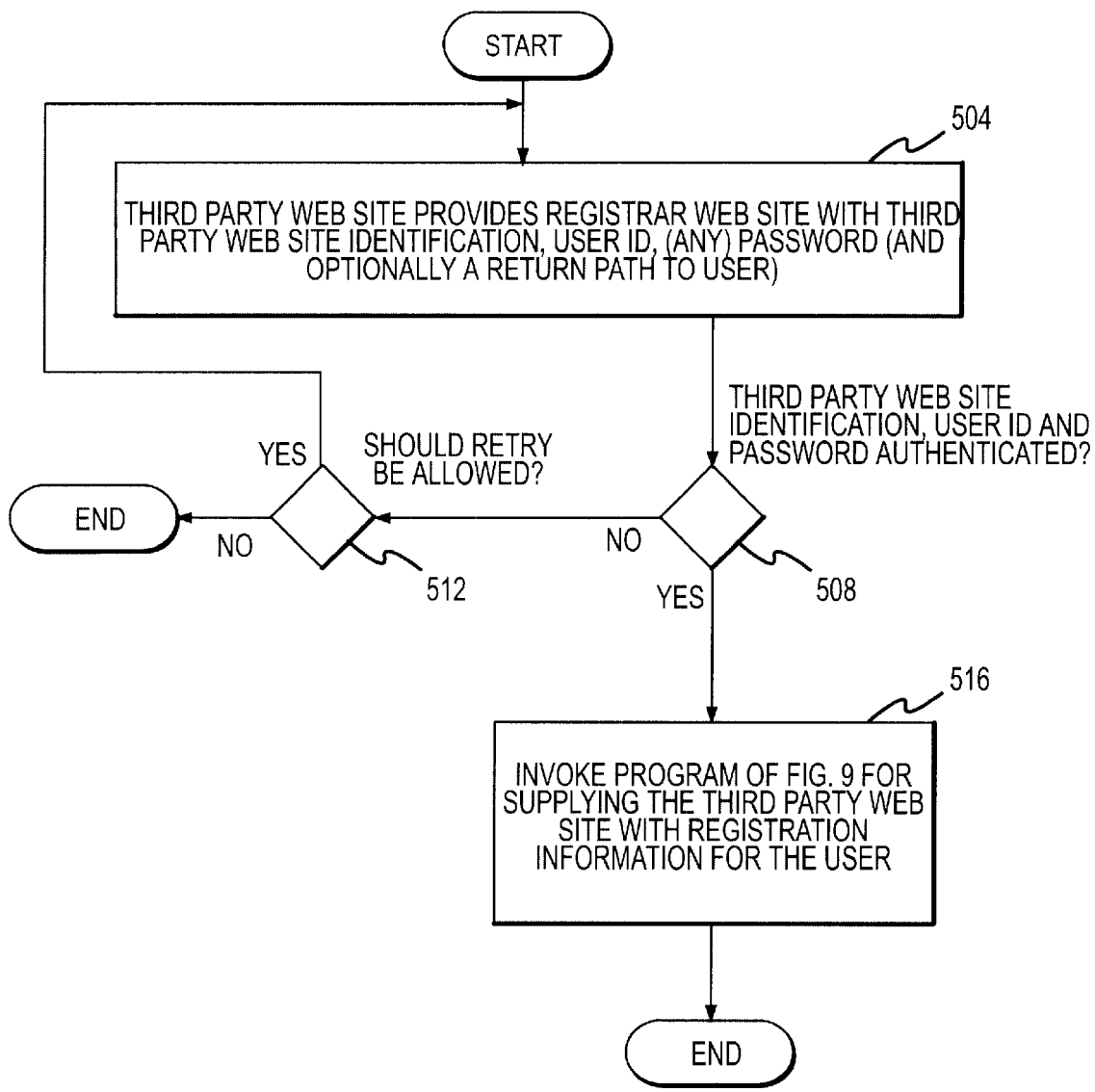
FIG. 8 is a flowchart of the steps performed by the present invention when transferring user registration information from the registrar web site 2100 to a third party web site 2116 to which the user has requested to register.

In FIG. 8, a flowchart is presented of the registration data transmission process from the registrar web site 2100 to a third party web site 2116. Accordingly, in step 504 the third party web site 2116 provides the registrar web site 2100 with identification of the third party web site, the user's registrar user ID and (any) registrar password. Further, in some instances, as will be described below, the third party web site 2116 also supplies the registrar web site 2100 with a return path to the user through the World Wide Web 2104. Following this, in step 508, a determination is made by the registrar web site 2100 as to whether the third party web site supplied information can be authenticated. If not all third party web site information is authenticated, then step 512 is encountered wherein a determination is made as to whether to request that the third party web site to resend the information of step 504. Note that such a determination may be made in one embodiment depending upon whether the third party web site identification is authenticated. That is, if the third party web site identification is authenticated, then a retry may be allowed. Otherwise, no retry may be allowed. Alternatively, referring again to step 508, if all information transmitted from the third party web site 2116 is authenticated at the registrar web site 2100, then step 516 is encountered. In this step, the program represented by FIGS. 9 is performed for supplying the third party web site 2116 with registration information related to the user from the user registration information database 2144.

Figure 9A:
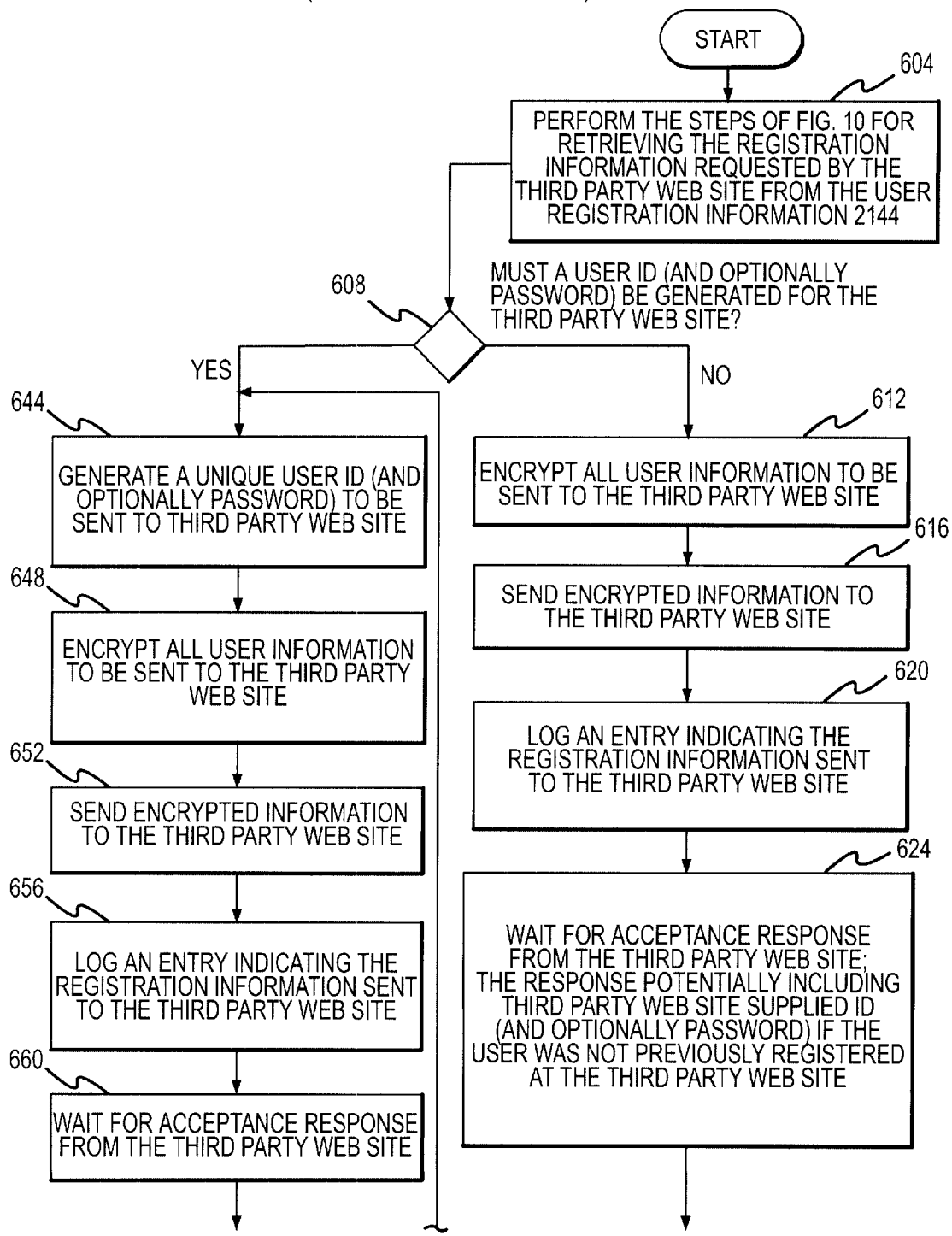
FIGS. 9A and 9B provide a flowchart of the steps performed when supplying a third party web site 2116 with registration information from the registrar web site 2100, assuming that the third party web site has requested such information and that the request has been authenticated at the registrar web site 2100.
Figure 9B:
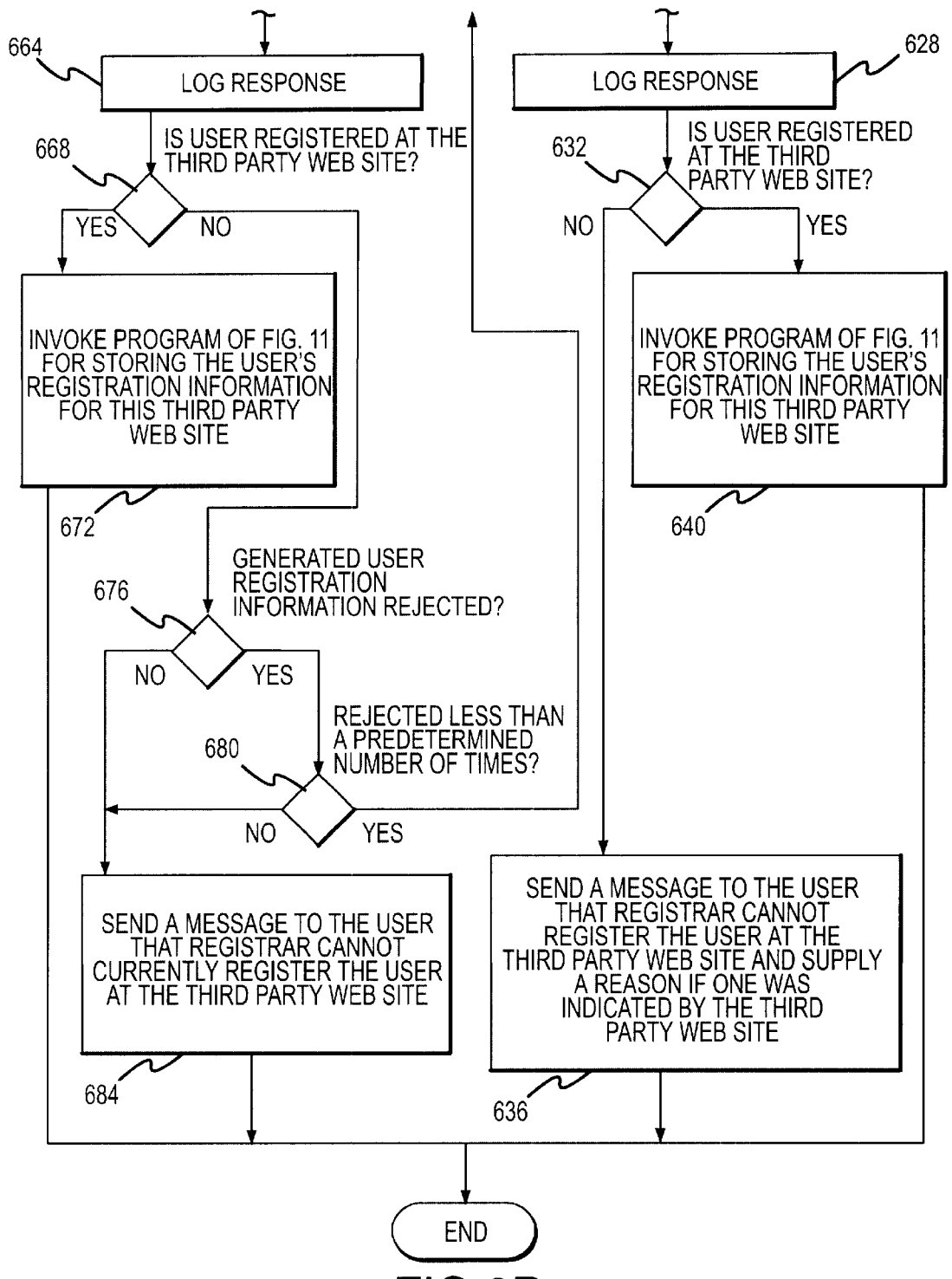

Referring now to FIGS. 9A and 9B, the flowchart presented here provides the steps for supplying a present third party web site 2116 with registration information from the registrar web site 2100, assuming that the present third party web site 2116 has requested such information and that the request has been authenticated at the registrar web site 2100. Accordingly, in step 604 the registrar web site 2100 or, more precisely, a registrar application 2128 performs the steps of FIG. 10 for retrieving the user registration information requested by the present third party web site 2116 from the user registration information database 2144. Note that a third party web site 2116 may request various categories of information from the registrar web site 2100 related to the user. In particular, a third party web site may request: (a) basic information as discussed in step 2308 of FIG. 6; (b) expanded information as discussed in step 2312 of FIG. 6; (c) custom information, wherein selected fields from the basic and expanded information are provided; and (d) proprietary information wherein one or more additional user related information items may be provided wherein these items have been obtained by the registrar web site 2100 by, for example, enriching and verifying the registration information obtained from the user as in step 2256 of FIG. 5B.

Following step 604, step 608 is encountered wherein a registration application 2128 determines whether the present third party web site 2116 requesting user information (for a user attempting to register at this third party web site) requires that a user ID (and optionally password) be generated specifically for this third party web site. That is, the third party web site 2116 may require a user ID and/or password that conforms with a format peculiar to the third party web site 2116. Note that to perform the step 608, in at least one embodiment of the present invention, information related to the requirements of the present third party web site 2116 are stored at the registrar web site 2100. In particular, the registrar web site 2100 may store a user information request template for each third coordinating party web site 2116 having access to user information at the registrar web site 2100 such that a registrar application 2128 (upon identifying a particular third party web site 2116) may access a related user information request template for determining what information may be required by this third party web site.

If a user ID and optionally password need not be generated specifically for the requesting third party web site 2116, then in step 612 the user information requested by the third party web site 2116 is encrypted and in step 616 the encrypted information is sent to the third party web site. Following this, in step 620 a registrar application 2128 logs an entry or a record in the registrar access log database 2152 indicating that registration information for the user has been transmitted to the present third party web site 2116. Subsequently, in step 624 a registrar application 2128 (or, more precisely, an instantiation thereof) waits for an acceptance response from the present third party web site 2116 to which the encrypted user information was sent. Note that the response from the present third party web site may include a third party web site specific user ID (and optionally password) if the user was not previously registered at this third party web site. That is, the third party web site may automatically generate at least a user ID if the user was not previously registered at the web site. Alternatively, it may be the case that the present third party web site uses the user's registrar registration user ID and password for registering the user at the third party web site 2116. Note that in at least one embodiment for registration processing at a third party web site 2116, the use of the registrar user ID does not create ambiguity in the identity of users registering at the third party web site. For example, a user seeking access to a cooperating third party web site may be required to indicate that his/her user ID and/or password is a registrar generated user ID (and/or password) so that the third party web site can process the entered user identification differently from that of users who have registered without using the present invention. Subsequently, when an acceptance response from the requesting third party web site 2116 is provided to the registrar web site 2100 (or, more precisely, a registrar application 2128), this response is logged in the registrar access log database 2152 in step 628. Following this latter step, in step 632, a determination is made as to whether the response from the present third party web site 2116 indicates that the user is now registered at this third party web site. If no such indication is provided, then in step 636 a message is sent to the user at the user's WWW client node 2108 that registrar cannot register the user at the present third party web site to which the user has requested registration and access. Further, the registrar application 2128 performing step 636 may also supply the user with a reason as to why the user cannot register through registrar at the present party web site if such a reason was indicated by this third party web site when the response of step 624 was received.

Figure 11:
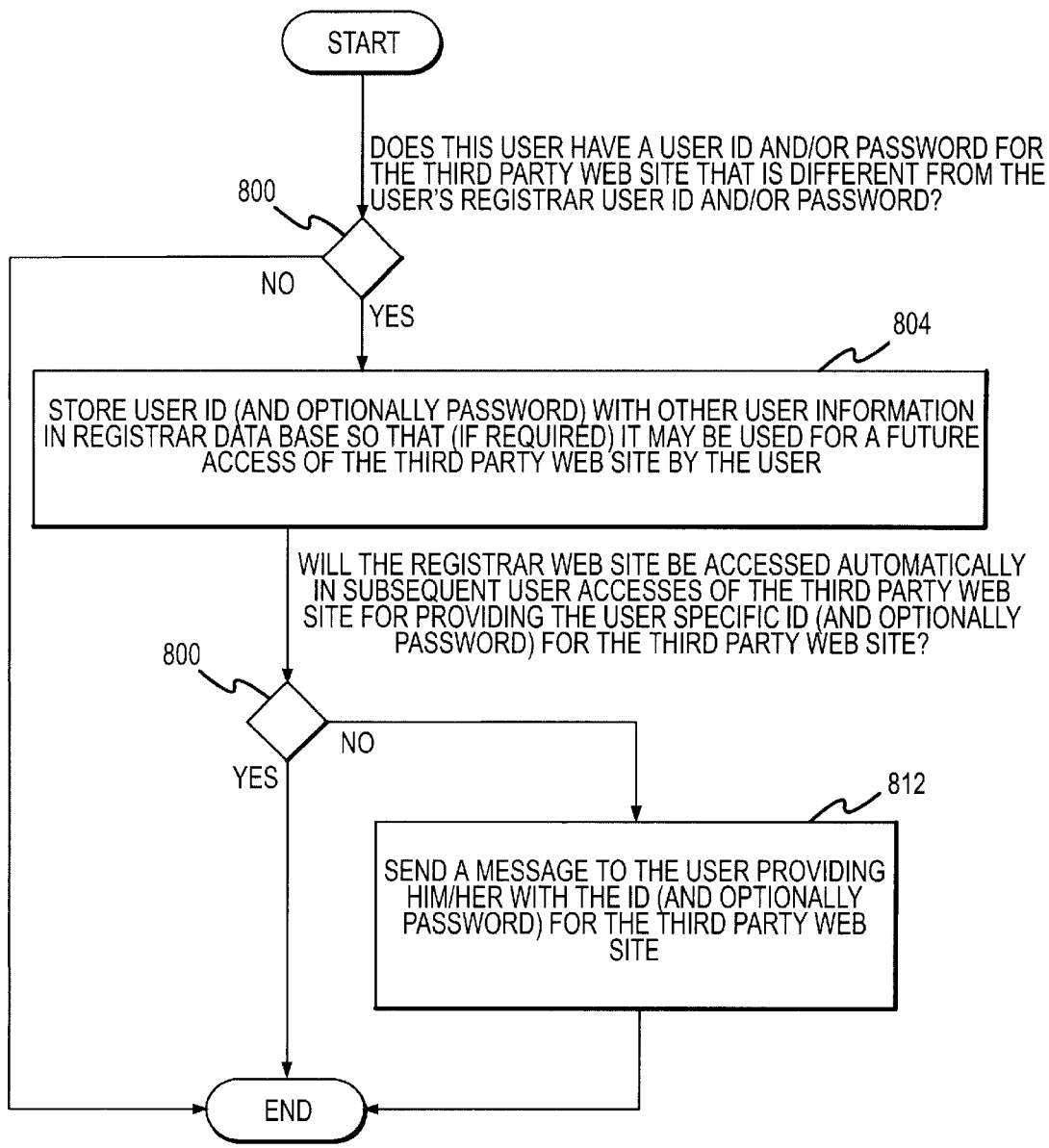
FIG. 11 presents a flowchart of the steps performed when-storing in the user registration information database 2144 a user's ID (and optionally password) relating to a third party web site 2116 to which the user is registered via using the present invention.

Alternatively, if in step 632 it is determined that the user is registered at the present third party web site, then in step 640 the program corresponding to the flowchart of FIG. 11 is performed for storing at least the user's ID (and optionally password) for the present third party web site at the registrar web site 2100 (more precisely, in the user registration information database 2144) as will be discussed hereinbelow.

Referring again to step 608 of FIG. 9A, if a registrar application 2128 is required to generate a user ID (and optionally password) for the third party web site 2116, then step 644 is next performed wherein a registrar application 2128 generates a user ID (and optionally password) to be transmitted to the third party web site 2116. Subsequently, the sequence of steps 648 through 668 are performed. Note that this sequence of steps is substantially the same sequence of steps as steps 612 through 632. However, the response from the present third party web site logged in step 664 may include an indication as to whether the user generated by the registrar application 2128 is acceptable to the present third party web site 2116.

Accordingly, continuing the discussion of FIGS. 9A and 9B from step 668, if the response from the present third party web site 2116 indicates that the user is registered at the desired third party web site, then step 672 is performed wherein the program corresponding to the flowchart of FIG. 11 is again used to store the user's ID (and optionally password) for the present third party web site in the user registration information database 2144 (as in step 640). Alternatively, if in step 668 it is determined that the user is not registered at the present third party web site 2116, then in step 676 a determination is made as to whether the generated user registration information (i.e., user ID and optionally password) step 644 has been rejected by the present third party web site. If so, then in step 680 a determination is made as to whether this rejection has occurred less than a predetermined number of times (i.e., the sequence of steps 644 through 668 have been iteratively performed less than a predetermined number of times in attempting to register the user at the present third party web site). If the results of the test in step 680 is affirmative, then step 644 is again encountered for generating alternative user registration information for the present third party web site. Note that it is an aspect of the present invention that, at least in one embodiment, such generations produce user IDs that are meaningful to the user and/or are related to other web site registration user IDs for the user. Thus, in one embodiment of the present invention, the step 644 uses the user's registrar user ID as a "seed" from which to generate a user ID acceptable to the present third party web site 2116. Moreover, note that the generation process of step 644 may use various heuristics and third party web site constraints to generate acceptable user IDs.

Alternately, if the negative branch from step 676 is followed, then the third party web site 2116 may have rejected registering the user for any of a number of reasons that may not be able to be alleviated in a timely fashion so that the user can be registered at this third party web site in a short amount of time. Accordingly, step 684 is encountered wherein a message is transmitted to the user's WWW client node 2108 indicating that registrar cannot currently register the user at the requested third party web site 2116. Further, note that if in step 680 it is determined that too many attempts have been made to generate acceptable registration information for the third party web site, then step 684 is also encountered.

The flowchart of FIGS. 9A and 9B is representative of the processing variations within the scope of the present invention for supplying a third party web site with registration information. For instance, those skilled in the art will appreciate that steps 624 and 660 may have a timer associated with them whereby if there is no response from the third party web site within a predetermined time period, then a default response is provided by a registrar application 2128 so that one of the steps 684 or 636 is performed as part of the processing when such a timer expires and subsequent steps in the flowchart are performed. Additionally, other steps may be inserted, for example, on the negative branch from step 676 wherein these additional steps attempt to address other anomalies indicated in the acceptance response received in step 660. For example, if the third party web site 2116 requests additional user information than what was provided in step 648, then if this additional information is in the user registration information database 2144 and the user has indicated that it is permissible to disseminate this information, then the additional information may be transmitted to the present third party web site 2116. Also, in such a case, the transmittal of this additional information is recorded in the registrar access log database 2152.

Figure 10:
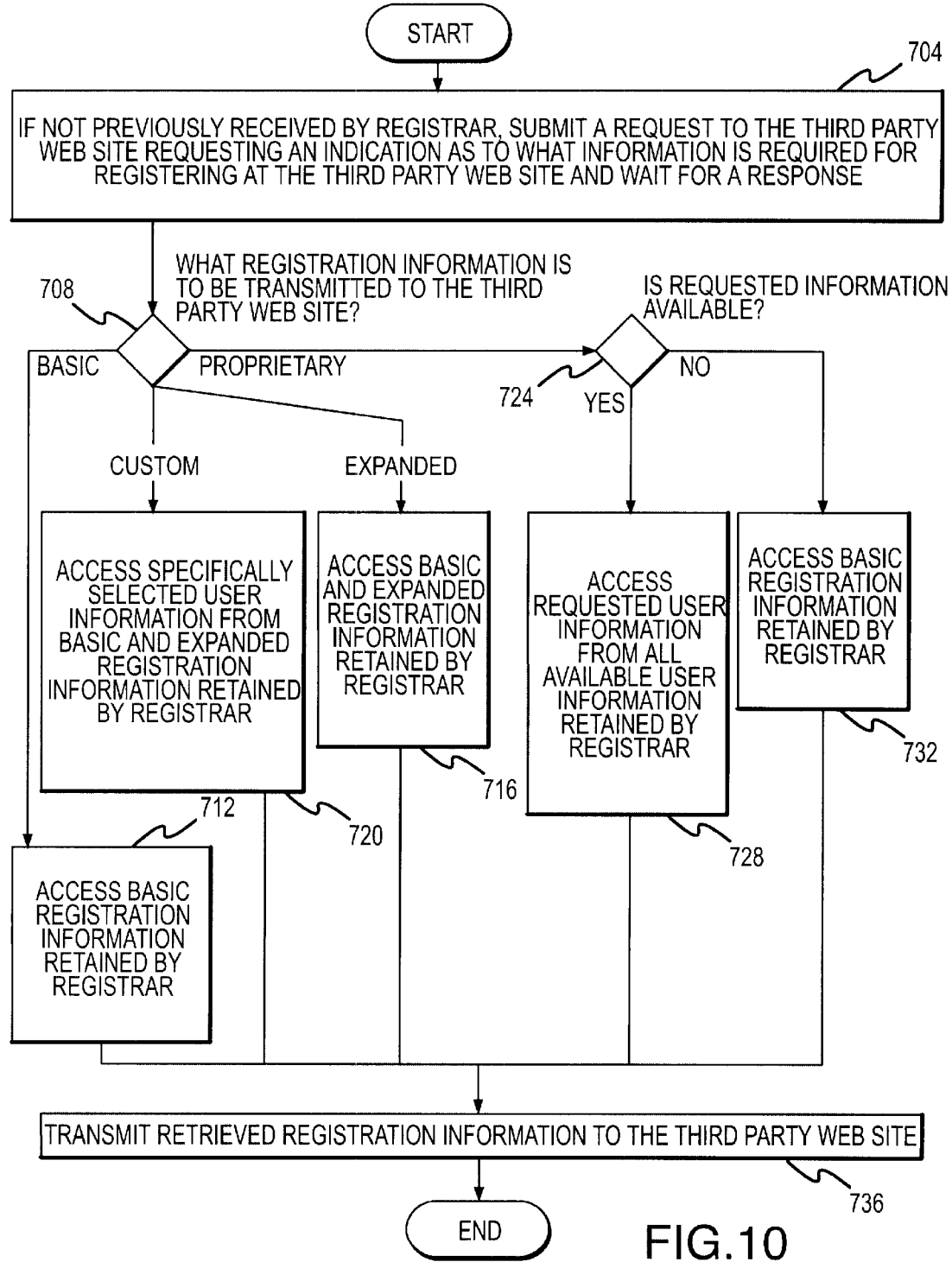
FIG. 10 presents a flowchart of the steps performed by the present invention when supplying a third party web site 2116 with user registration information from the user registration information database 2144.

Referring now to FIG. 10, wherein the flowchart for a program is provided for supplying, from the user registration information database 2144, a requesting third party web site 2116 with registration information related to a particular user. Accordingly, in step 704 of FIG. 10, if the registrar web site 2100 has not been previously supplied with an indication as to what type of information is required by the requesting third party web site, then a registrar application 2128 constructs such a request to be transmitted to the requesting third party web site and subsequently the application may wait for a response from this third party web site. Following step 704, in step 708 it is assumed that the registrar web site 2100 has been provided with an indication or specification as to what information the requesting third party web site desires. Thus, the registrar application 2128 performing step 704 may now determine what registration information is to be transmitted to this third party web site. Note that at least in one embodiment of step 708, the user registration information requested may require validation according to the following criteria:

(1.1) The type and amount of registration information for a user that the user has indicated is available to be transmitted to a requesting third party web site.

(1.2) The type and amount of information the requesting third party web site 2116 has contracted with the registrar web site 2100 for transmitting regarding a particular user or category of users.

(1.3) The registration information available in the user registration information database 2144.

Thus, as discussed with respect to step 604 of FIG. 9A, either basic, expanded, custom or proprietary registration information related to a user is transmitted to the requesting third party web site in step 736.

FIG. 11 presents a flowchart for storing, in the user registration information database 2144, a user's ID and/or password for a third party web site 2116 to which the user is registered using registrar. More precisely, the user ID and/or password for such a third party web site is stored via the steps of FIG. 11 if this information is different from the user's registrar user ID and/or password. That is, it is believed that for many third party web sites 2116, the registrar user ID and password for users registered at the registrar web site 2100 will be identical to the user's user ID and password at third party web sites. Note that there are significant advantages to third party web sites 2116 using, for each registered user, the user's registrar user ID and password (or, some other user ID and password in common with other third party web sites to which the user is registered). For instance, a user is required to remember fewer user IDs and passwords associated with web sites and the web sites providing this convenience may have a higher volume of users accessing the web site due to the greater ease of access.

Regarding the steps of FIG. 11, in step 800 a determination is made as to whether the user has been provided with a user ID (optionally password) for the third party web site 2116 (to which the user is attempting to register) that is different from the user's registrar user ID and/or password. If not, then there is nothing additional to store at the registrar web site 2100 and the flowchart ends. Alternatively, if the decision of step 800 results in a positive answer, then step 804 is performed wherein the user's specific user ID and optionally password for this third party web site is stored with other user registration information in the user registration information database 2144. Note the following advantages accrue by storing user registration information at the registrar web site: (a) each user has the convenience of off-site storage backup for each such third party web site to which the user is registered and (b) depending on the registration process at the third party web site, it may be expedient for such a web site (at least temporarily) to automatically contact the registrar web site 2100 for retrieving, for example, the user's third party web site specific user ID upon subsequent user accesses to the third party web site.

Following step 804, in step 808 a determination is made as to whether the third party web site has indicated that it will initiate requests as in (b) immediately above. If so, then no further processing needs to be accomplished here in that the user may enter his/her user registrar web site 2100 user ID (and optionally password) when accessing the third party web site. Alternatively, if step 808 yields a negative answer then step 812 is performed wherein the registrar web site 2100 sends a message to the user at the user's WWW client node 2108 providing the user with the ID (and optionally password) for the third party web site.

In an alternative embodiment of the present invention, a registrar registration module 2156 may be provided at the user's WWW client node 2108. This module (whether incorporated into the WWW browser 2120 or external to the browser and communicating with the browser through, for example, a browser 2120 port) may store locally at the client node 2108 registration information for accessing third party web sites 2116 to which the user has registered using the present invention. In FIGS. 12–16, flowcharts are provided for programs illustrating the processing of this alternative embodiment of the present invention.

Figure 12:
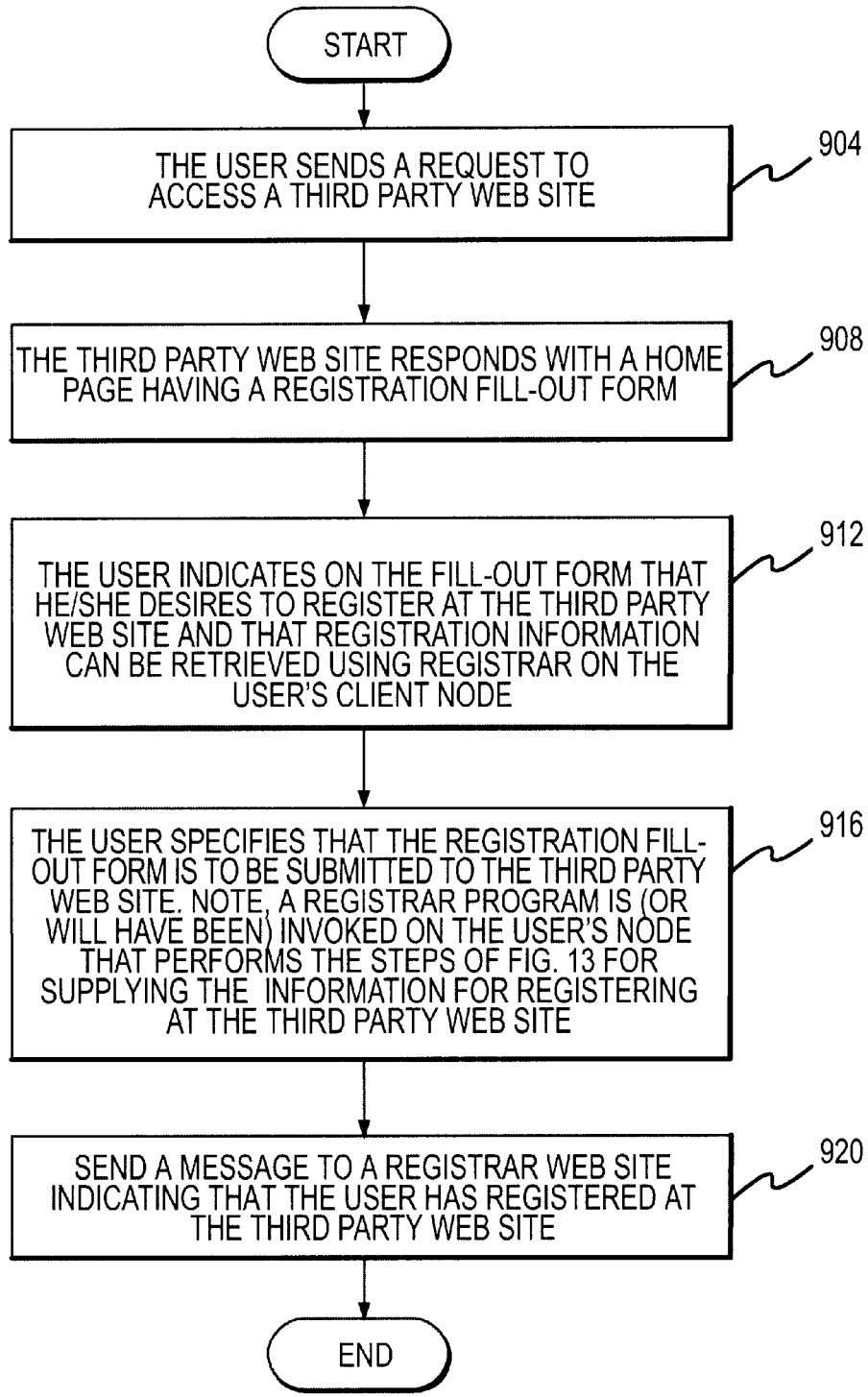
FIG. 12 is a flowchart of the steps performed when registering at a third party web site 2116 using the module 2156 of the present invention installed on the user's client node 2108.

In FIG. 12, a flowchart is presented of the program for registering at a third party web site 2116 when the module 2156 is installed on the user's client node 2108.

Describing now the steps of FIG. 12, in step 904 the user sends a request to access a third party web site 2116 via the user's WWW browser 2120. Subsequently, upon receiving the request, the accessed third party web site 2116 responds with a home page having a registration fill-out form (step 908). Assuming that the registration fill-out form allows the user to indicate that user registration information may be obtained locally at the client node 2108, in step 912 the user indicates on the fill-out form that he/she desires to register at the third party web site and that his/her registration information can be retrieved using the registrar registration module 2156 residing on the user's client node 2108. Further note that the user may be required to activate or alert the module 2156 so that this module can supply the appropriate user registration information to be communicated to the third party web site 2116. Also note that the home page from the third party web site 2116 may indicate the type of information required to register the user and this information may be used either manually or automatically for determining the user registration information stored on the user's client node 2108 that will be transmitted to the third party web site. Subsequently, in step 916 the user specifies that the registration fill-out form is to be submitted to the third party web site. Accordingly, the WWW browser 2120 communicates with the registrar registration module 2156 to supply the registration information to the third party web site. That is, the processing performed here includes the steps of FIG. 13 which are described herein below. Subsequently, in step 920 a message is sent from the registration module 2156 to the registrar web site 2100 indicating that the user has registered at the third party web site and additionally supplying the registrar web site 2100 with any user ID and password specific to the third party web site. Note that by sending this information as well as, for example, a copy of substantially all of the user's registration information stored locally to the registrar web site 2100, the user is provided with an automatic off-site backup of his/her registration information. Additionally, the user may be provided with other advantages by providing his/her user registration information to the registrar web site 2100. In particular, the registrar web site 2100 may enrich the user's registration information with publicly available information on the user and alert the user to discrepancies between the user information and various publicly available records on the user.

Figure 13:
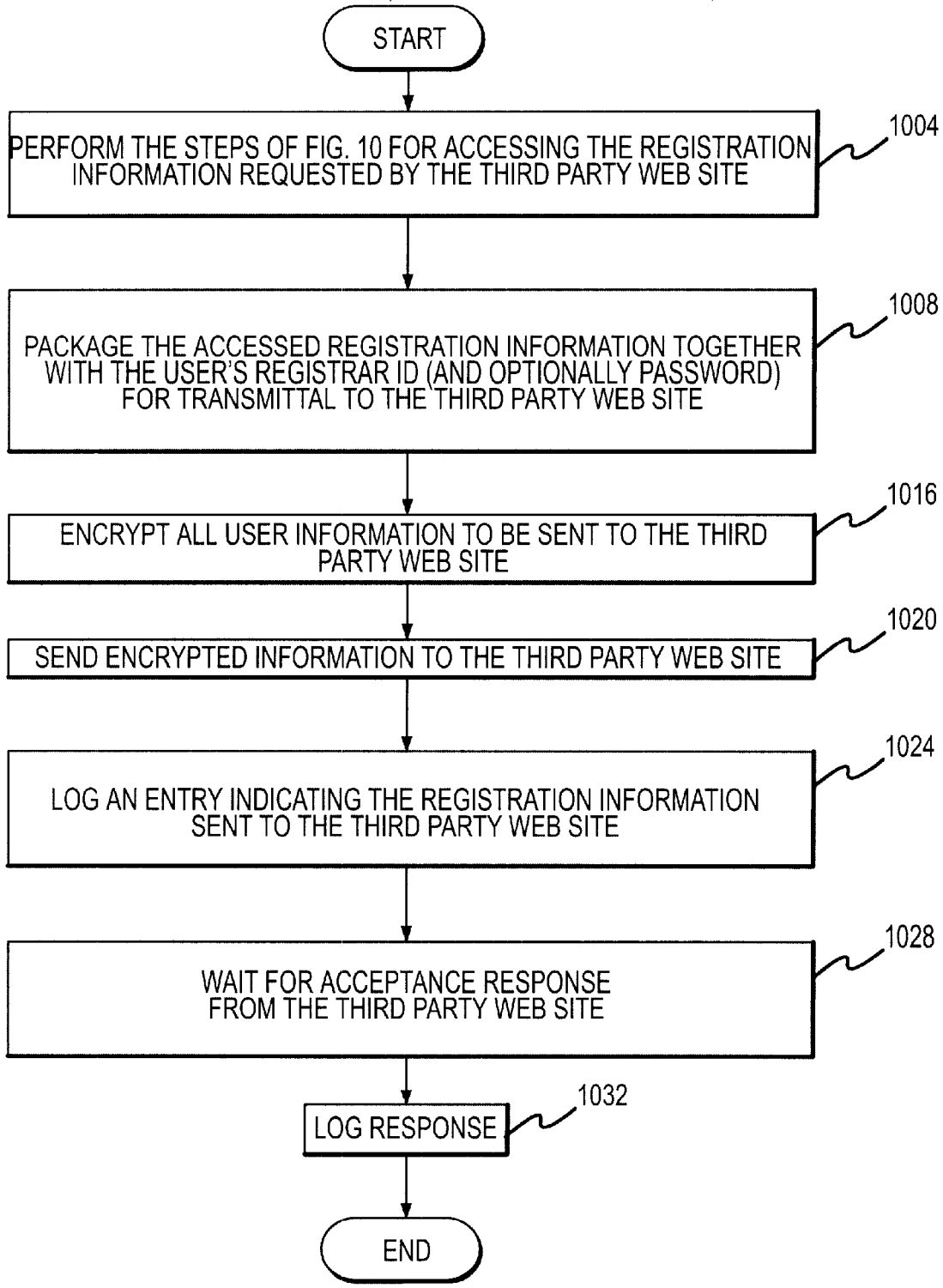
FIG. 13 is a flowchart of the steps performed when the registration module 2156 on the user's client node is utilized in supplying a third party web site 2116 with registration information.

Referring now to the flowchart of FIG. 13, this flowchart describes the steps performed when supplying a third party web site 2116 with registration information retained by the registrar registration module 2156 on the user's node. In step 1004, the steps of the flowchart of FIG. 10 are performed for retrieving the registration information requested by the third party web site. Subsequently, in step 1008 the registrar registration module 2156 packages the accessed registration information for the third party web site together with the user's registrar ID (and optionally password) for transmittal to the third party web site. Subsequently, in step 1016 the registration information packaged together in step 1008 is encrypted so that in step 1020 this encrypted information may be sent securely to the third party web site via the World Wide Web 2104. Following this, in step 1024 the module 2156 logs an entry into a local log on the client node 2108 indicating what registration information was sent to the third party web site. Subsequently, in step 1028 a process may be instantiated to wait for an acceptance response from the third party web site so that when such a response is obtained it may be logged locally at the client node 2108 in step 1032.

In one embodiment of the present invention the user may configure the registrar registration module 2156 to log all activities with third party web sites 2116 and provide the records of this log to the registrar web site 2100. This allows the registrar web site 2100 or personnel that maintain the registrar web site 2100 to analyze user activities on the World Wide Web 2104.

Such analysis may be useful to both registrar users and third party web site personnel in that, given a user's World Wide Web 2104 activity, the registrar web site 2100 may suggest additional third party web sites 2116 of which the user may not be aware. Further, by analyzing the user access logs of registrar users, the registrar web site 2100 may provide statistics to the third party web sites 2116 as to the number and types of users accessing their respective web sites.

Figure 14A:
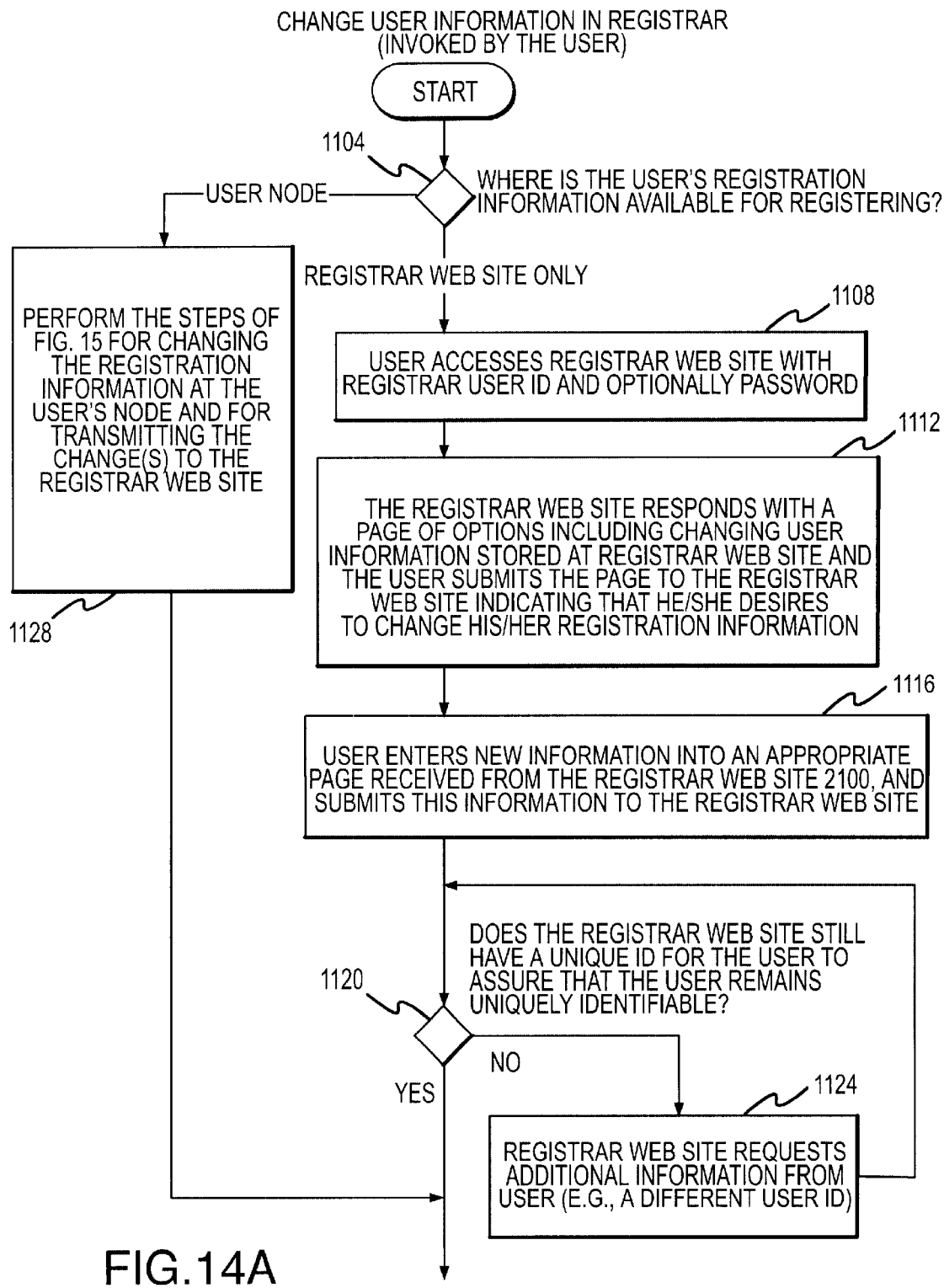
FIGS. 14A and 14B present a flowchart of the steps performed when a World Wide Web user of the present invention changes his/her registration information stored in the present invention.
Figure 14B:
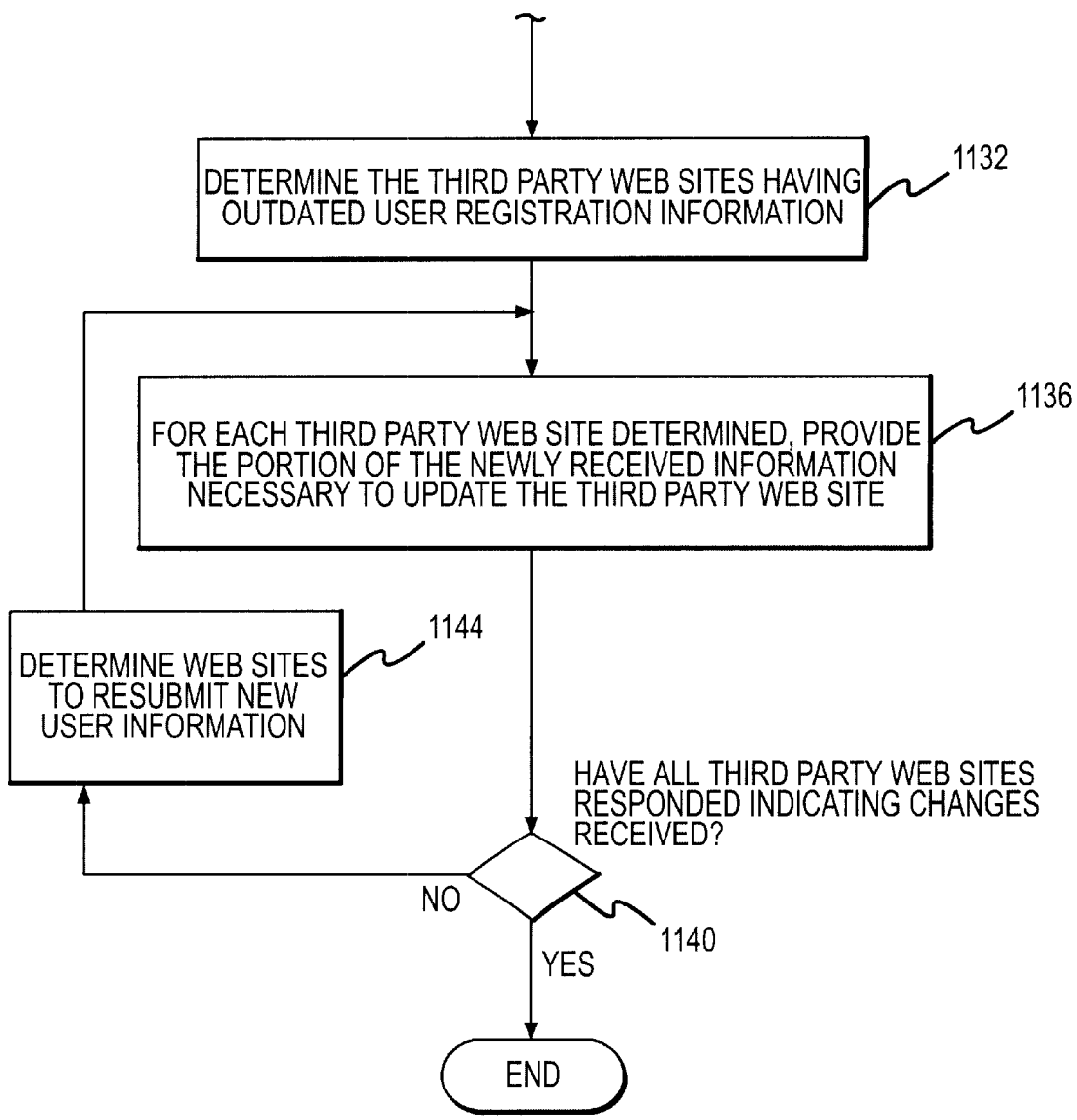

FIGS. 14A and 14B present a flowchart for the steps performed by the present invention when the user changes his/her registrar registration information. That is, the flowchart of FIG. 14 encompasses both the architecture or embodiment of the present invention wherein the user's registration information is stored substantially only at the registrar web site 2100, and also the architecture or embodiment wherein the user's registrar information is also stored at the user's client node 2108. Accordingly, in step 1104 a determination is made as to where the user's registration information is stored. Note that this step 1104 is unlikely to be explicitly performed by either the present invention or the user. Instead, the embodiment of the present invention determines which of the paths from this step to follow (i.e., if module 2156 exists, then the "USER NODE" branch is followed; otherwise, the "REGISTRAR WEB SITE ONLY" branch is followed). Accordingly, assuming that the present invention is embodied such that the user's registration information is stored at the web site 2100 only, then step 1108 is encountered wherein the user-accesses the registrar web site 2100 from his/her WWW client node 2108 by entering his/her user ID and optionally password. Subsequently, in step 1112 the registrar web site 2100 responds with a web page having a number of options related to the user's registration information and registrar web site 2100 processing of this information. Note that such options include a request by the user to modify the user's registration information stored at the registrar web site. Additionally, other options may be also provided to the user including: (a) an option for requesting to be no longer affiliated with the registrar web site 2100 and have all the user's registration information deleted; (b) an option for requesting to examine all information regarding the user stored at the registrar web site 2100, including all information the registrar web site has obtained from publicly available sources; (c) a request for procedures and/or addresses to contact publicly available databases that registrar has accessed obtaining incorrect user information; and (d) third party web sites 2116 that are providing information for a limited period of time and for which the user may be interested. Following step 1112, in step 1116 the user enters new information into an appropriate fill-out form received at the user's WWW client node 2108 from the registrar web site 2100. Note that this form is likely to be in a page different from the page of options described in step 1112. That is, upon submission of the page of options, the registrar web site 2100 responds with a new page(s) having fill-out forms with the presently stored user registration information presented in the forms so that the user may change any of the fields on this page(s).

Note that in at least one embodiment of the present invention, the user is allowed to change his/her registrar user ID and/or password. However, it may be the case that when a user changes his/her registrar user ID, that the new requested user ID has already been assigned to another registrar user. Thus, the registrar web site 2100 may respond with a request for further information (such as a request for a different user ID from the user) wherein when the user submits the additional information, the registrar web site 2100 again checks to determine if the user is uniquely identifiable. Note that the loop of steps 1120 and 1124 are provided to represent the iterative process described here of changing the user's user ID. Further note that in some embodiments of the present invention, the registrar web site 2100 may respond with alternative variations for a new user ID so that the user is not left to guess at a registrar user ID that is acceptable for uniquely identifying the user.

Returning now to step 1104, if the user's registration information is stored locally at the user's client node 2108, then step 1128 is performed instead of the steps 1108–1124. However, for simplicity, a discussion of the processing performed in step 1128 is not described in detail here. Instead, a detailed discussion of this step is provided by FIG. 15 and the discussion of FIG. 15 hereinbelow for changing the registration information at the user's client node 2108 and for transmitting the changes to the registrar web site 2100.

Regardless of the branch of processing taken from step 1104, eventually step 1132 and the subsequent steps of FIG.

14B are encountered wherein the present invention updates or alerts third party web sites having previously received user registration information that this information may be outdated. Thus, the steps 1132–1140 are performed so that the registration information provided to such third party web sites via the present invention is consistent with the newly supplied user registration information. However, in at least one embodiment of the present invention, prior to providing any newly entered user registration information to the third party web sites, such information may be compared or correlated with publicly available information regarding the user that is, for example, accessible via certain third party web sites 2116. Further, the user may request his/her newly entered registration information by supplied to only selected web sites to which the user is registered, or alternatively, the user may request that the newly entered registration information be supplied to all web sites to which the user is registered.

Figure 15A:
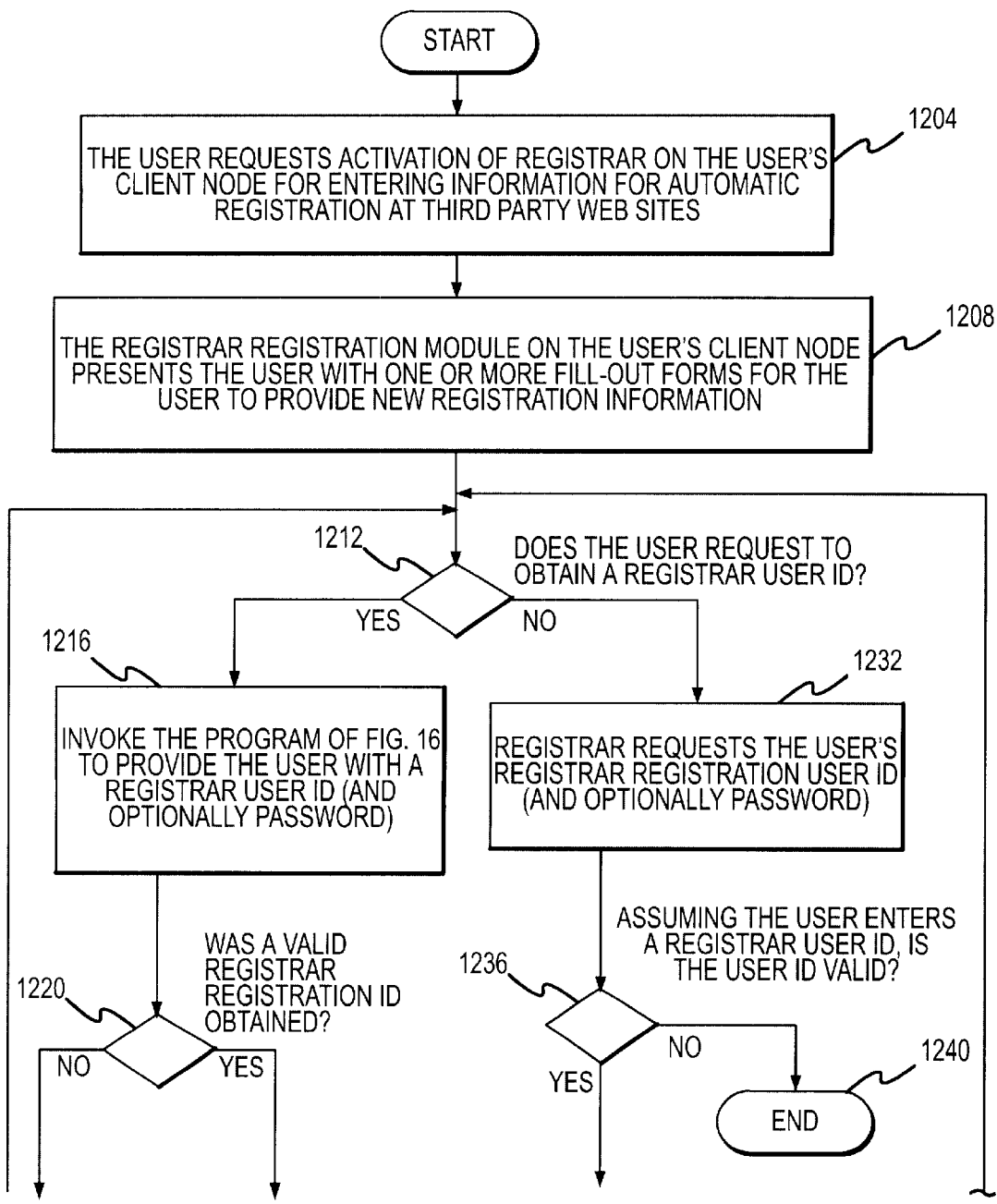
FIGS. 15A and 15B present a flowchart of the steps performed when the architecture of the present invention includes the registration module 2156 provided at the user's client node 2108 and the user requests to enter registration information into the present invention using this module.
Figure 15B:
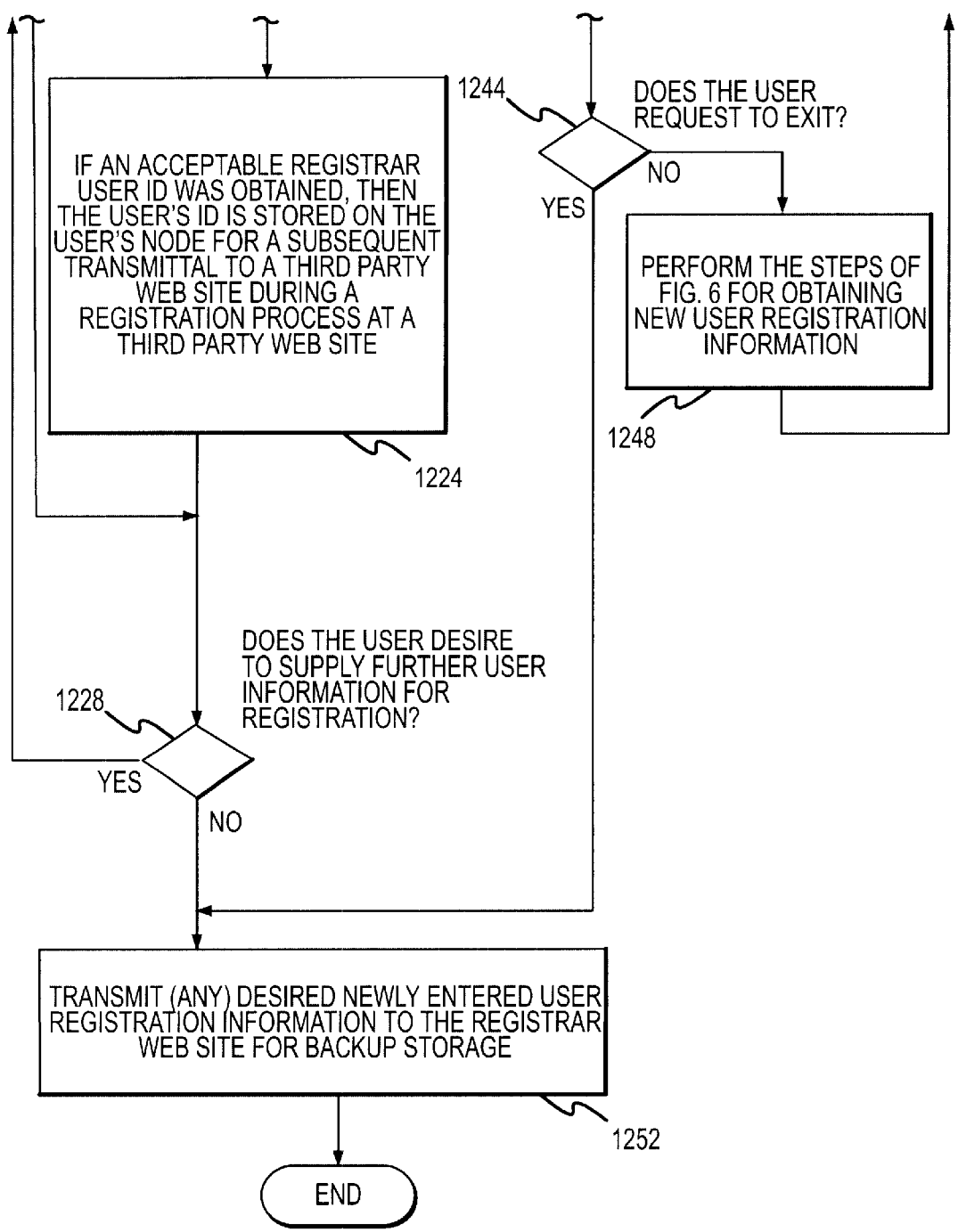
Figure 16A:
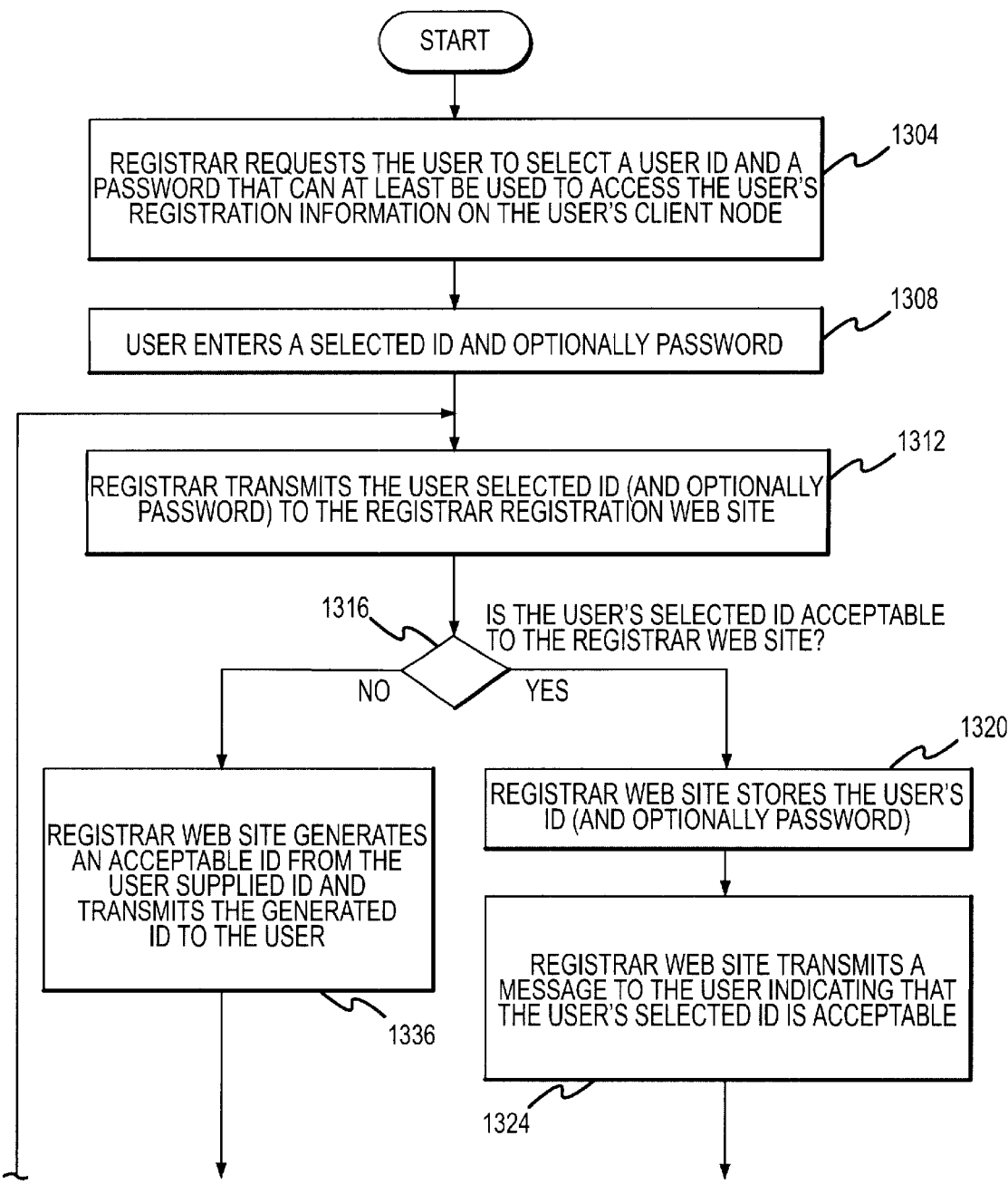
FIGS. 16A and 16B provide a flowchart of the steps performed when a World Wide Web user requests a user ID for the registration information processing system of the present invention and the present invention includes module 2156 on the user's client node 2108.
Figure 16B:
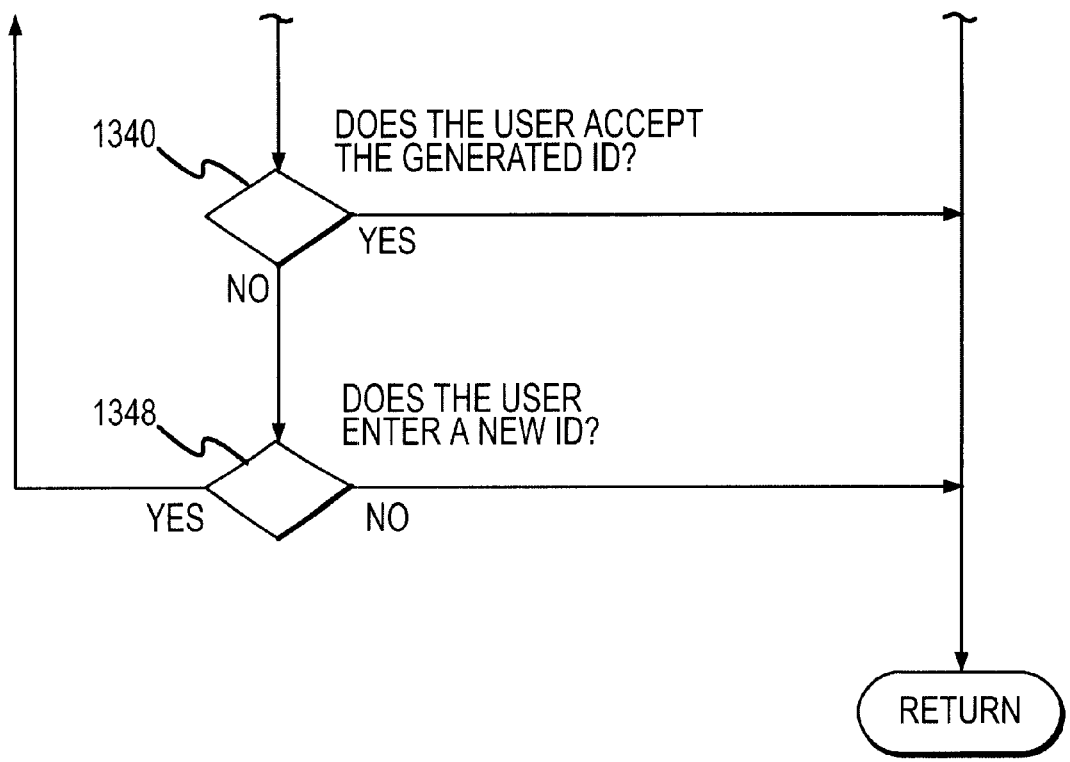

FIG. 15 presents a flowchart of the steps performed when the registrar registration module 2156 is provided at the client node 2108 and the user enters registration information into this module. Note that the steps of this flowchart may be performed when the user is entering registration information for registering the user with registrar, or when modifying registration information already supplied to registrar. Accordingly, in step 1204 the user requests activation of the registrar registration module 2156 on the user's client node 2108 for entering information that will subsequently be used for registering substantially automatically cooperating at third party web sites 2116 requested by the user. Subsequently, in step 1208 the registrar registration module 2156 on the user's client node 2108 presents the user with one or more fill-out forms for the user to provide new registration information. Following this, in step 1212 a determination is made as to whether the user requests to obtain a registrar user ID. If so, then in step 1216 the program corresponding to the flowchart of FIG. 16 is performed to provide the user with a valid registrar user ID and optionally password. Subsequently, in step 1220 a determination is made as to whether the program of FIG. 16 returns a valid registrar user ID. If so, then step 1224 is performed wherein the new user's registrar ID is stored on the user's node 2108 for a subsequent transmittal to a third party web site during a registration process at a third party web site that accepts the registrar user ID as the web site's ID. Subsequently, regardless of the path taken from step 1220, step 1228 is encountered wherein a determination is made as to whether the user desires to enter further user registration information.

If the user desires to enter further information, then step 1212 is again encountered and a determination is made once again as to whether the user requests to obtain a registrar user ID. However, it is important to note that the steps provided in this flowchart are only an indication of the processing provided by the registrar registration module 2156 and the user's browser. In particular, since the user interfaces typically used by World Wide Web browsers allow a user to select the fill-out form fields to modify, the positive branch from step 1212 is taken only when the user enters information in a fill-out form field indicating that a registrar user ID is requested. Similarly, the negative branch from step 1212 is taken whenever user information is entered into other fill-out form fields unrelated to obtaining a registrar user ID.

Accordingly, if the user desires to enter other information than that required to obtain a registrar user ID, then from step 1212, step 1232 is encountered wherein the registrar registration module 2156 explicitly requests the user's registrar registration user ID (and optionally password). Subsequently, in step 1236, assuming the user enters a registrar user ID, a determination is made as to whether the registrar user ID is valid. Note that this determination is initially made locally at the user's client node 2108 without contacting the registrar web site 2100. However, in one embodiment of the present invention, it is an option that if the registrar user ID entered is not found in the client node 2108, then the registrar registration module 2156 may inquire of the user as to whether he/she desires the registrar web site 2100 to be interrogated for the registrar user ID and password and, if found, download the user's registration information to the user's client node 2108. If no valid registrar user ID is determined in step 1236, then the program ends in step 1240. Alternatively, if a valid registrar user ID is obtained, then in step 1244 a determination is made as to whether the user requests to exit the present program and thereby stop supplying registration information. Note that this step is similar to step 1212 in that if the user continues to enter registration information in fill-out form fields, then the negative branch from this step is followed and, alternatively, if the user, for example, activates an exit button on the user interface, then the positive branch from step 1244 will be followed. Accordingly, if the negative branch is followed, then in step 1248 the program of FIG. 6 is performed for obtaining new user registration information and, subsequently, step 1212 is encountered (or, more precisely, the user interface is provided that allows the user to request a registrar user ID).

Alternatively, if the positive branch is taken from step 1244, then step 1252 is encountered wherein the registrar registration module 2156 transmits (or schedules the transmission of) any newly entered user registration information that the user desires to be transmitted to the registrar web site 2100 for backup storage. Thus, in one embodiment of the present invention, the step 1252 provides the user with the option to discard the registration information provided in step 1248 above instead of transmitting this information to the registrar web site 2100.

In FIG. 16, a flowchart is presented of the program for obtaining a registrar user ID and optionally password for the embodiment of the present invention wherein the registrar registration module 2156 retains the user's registrar user ID (and optionally password) for automatically providing to third party web sites at which the user requests registration using the present invention. Accordingly, in step 1308 the registrar registration module 2156 requests the user to select a registrar user ID and optionally a password that can be used to access the user's registration information at both the user's client node 2108 and at the registrar web site 2100. Assuming that the user enters a user ID and optionally password in step 1308, in step 1312 the registrar registration module 2156 transmits the user selected ID and optionally password to the registrar web site 2100. Subsequently, in step 1316 a determination is made by the registrar application 2128 as to whether the user's selected user ID and optionally password are acceptable to the registrar web site. That is, a registrar application 2128 accesses the user registration information database 2144 to determine if the selected user ID is sufficiently unique. Note that other steps may be performed between steps 1308 and 1312. For example, the syntax for user IDs and optionally passwords may be checked at the module 2156 prior to transmitting the user's selected registration information to the registrar web site 2100.

Continuing with step 1316, a determination is made at the registrar web site 2100 as to whether the user's selected user ID and optionally password are acceptable to registrar. If so, then in step 1320 a registration application 2128 stores the user's ID and optionally password in the user registration information database 2144. Note that since it is unlikely that any further information related to the present user is stored at the registrar web site, the process of storing the user's user ID and optionally password includes creating a new record in the database 2144 and marking all remaining fields related to registration information for this user to indicate that these fields are as yet not valid. Following this, in step 1324 a registrar application 2128 transmits a message to the user's WWW browser 2120 indicating that the user's selected user ID and optionally password is acceptable to registrar.

Alternatively, if the negative path is taken from step 1316, then step 1336 is encountered wherein a registrar application 2128 attempts to generate an acceptable user ID and optionally password as a substitute for the user's proposed user ID (and optionally password). Note that in generating alternative registration information, the registrar application 2128 may use the user supplied information as the basis or "seed" for generating an acceptable user ID (and optionally password) to be transmitted back to the user. Accordingly, in step 1340, once the user is presented with the newly generated registration information on the user's client node 2108, the registrar registration module 2156 provides the user with the option to accept or reject the generated information. If the user accepts the generated registration information, then the flowchart ends. Alternatively, if the user rejects this information, then in step 1348 a further determination is made by the module 2156 as to whether the user enters a new user ID (and optionally password) as an alternative to the generated registration information. If such new user registration information is provided, then step 1312 and steps thereafter are again performed in attempting to provide a registrar user ID (and optionally password) to the user. Alternatively, if the user indicates in step 1348 that no further proposed candidates for a user ID (and optionally password) will be forthcoming, then the flowchart ends without an acceptable registrar user ID being obtained.

The foregoing discussion of the invention has been presented for purposes of illustration and description. Further, the description is not intended to limit the invention to the form disclosed herein. Subsequently, variation and modification commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for use in notifying a consumer of media content, based upon information regarding the consumer obtained from a registration site, comprising:

accessing a registration site containing information regarding the consumer;

obtaining, via a communications network, interest information relating to the consumer, wherein said interest information is obtained based upon said information regarding said consumer;

identifying media content for the consumer based on said obtained interest information;

generating notification information pertaining to said identified media content; and providing said notification information to the consumer, whereby the consumer is notified via said communications network of media content of potential interest to the consumer based on said interest information;

wherein said information is obtained by:

receiving, at a first node of said communications network, said interest information from a second node of said communications network associated with the consumer, said interest information including demographic information regarding the user;

storing said interest information at said first node;

receiving, at said first node, a communication from said second node regarding retransmission of said interest information from said first node to a third node of said network; and retransmitting, based on said communication from said second node to said third node said interest information from said first node to said third node, wherein the consumer can automatically provide at least one portion of said interest information to said third node.

2. A method as set forth in claim 1, wherein said step of obtaining interest information comprises receiving information from said particular consumer via said communications network.

3. A method as set forth in claim 1, wherein said step of obtaining interest information comprises accessing a database of user information.

4. A method as set forth in claim 3, wherein said database includes information regarding one of content preference information; demographic information, product interest information and lifestyle information regarding the particular consumer.

5. A method as set forth in claim 1, wherein said step of identifying media content comprises identifying one of a live performance event, a television program, a radio program, a sound recording; and an internet event.

6. A method as set forth in claim 1, wherein said step of identifying media content comprises accessing a content database including, for each of multiple content entries, identification information identifying the entry and content information regarding the content, and analyzing said content information relative to said interest information to identify any potential matches.

7. A method as set forth in claim 1, wherein said step of generating notification information comprises constructing a list of said identified media content.

8. A method as set forth in claim 1, wherein said step of providing notification information comprises sending an e-mail including said notification information.

9. A method as set forth in claim 1, wherein said step of providing notification information comprises transmitting information to said particular consumer via one of a wireless telephone and a wireline telephone.

10. A method as set forth in claim 1, further comprising the steps of receiving scheduling information from said particular consumer regarding a schedule according to which said particular consumer desires to receive said notification information and providing said notification information in accordance with said scheduling information.

* * * * *